(12) United States Patent
McIntosh et al.

(10) Patent No.: US 10,891,869 B1
(45) Date of Patent: Jan. 12, 2021

(54) GROUND COLLISION AVOIDANCE SYSTEM AND METHOD THEREOF

(71) Applicant: HALO Aeronautics, LLC, Atlanta, GA (US)

(72) Inventors: P. Stuckey McIntosh, Atlanta, GA (US); W. Mercer Dye, Brookhaven, GA (US)

( * ) Notice: Subject to any disclaimer, the term of this patent is extended or adjusted under 35 U.S.C. 154(b) by 0 days.

(21) Appl. No.: 16/588,998

(22) Filed: Sep. 30, 2019

Related U.S. Application Data

(60) Provisional application No. 62/738,549, filed on Sep. 28, 2018.

(51) Int. Cl.
| | |
|---|---|
| G08B 21/00 | (2006.01) |
| G08G 5/06 | (2006.01) |
| B64D 45/00 | (2006.01) |
| B60Q 9/00 | (2006.01) |

(52) U.S. Cl.
CPC .............. *G08G 5/06* (2013.01); *B60Q 9/008* (2013.01); *B64D 45/00* (2013.01)

(58) Field of Classification Search
CPC ........... G08G 5/06; B60Q 9/008; B64D 45/00
USPC ......................................................... 340/945
See application file for complete search history.

(56) References Cited

U.S. PATENT DOCUMENTS

| | | | |
|---|---|---|---|
| 2015/0170525 A1* | 6/2015 | Conner ................ | G08G 5/0021 701/3 |
| 2015/0262492 A1* | 9/2015 | Barnes .................. | G08G 5/065 701/301 |
| 2017/0294132 A1* | 10/2017 | Colmenares ........... | G08G 5/045 |
| 2019/0266904 A1* | 8/2019 | Kant ..................... | G08G 5/0021 |

* cited by examiner

*Primary Examiner* — Tanmay K Shah
(74) *Attorney, Agent, or Firm* — Kutak Rock LLP; Jason S. Jackson

(57) ABSTRACT

The embodiments of the disclosed invention provide apparatuses, systems, and methods for preventing ground collisions or physical contact between a vehicle and nearby objects. In various embodiments the vehicle can comprise an aircraft and the nearby object can comprise a hangar. Embodiments of the invention can provide a proximity warning triggered by changes in certain electrical characteristics of the vehicle body relative to its surroundings, said changes responsive to the separation distance between the vehicle and nearby objects, persons or structures.

20 Claims, 22 Drawing Sheets

GROUND COLLISION AVOIDANCE SYSTEM AND METHOD THEREOF

CROSS-REFERENCE TO RELATED APPLICATIONS

This application claims priority pursuant to 35 U.S.C. 119(e) to U.S. Provisional Patent Application Ser. No. 62/738,549, filed Sep. 28, 2018, the entire disclosure of which is incorporated herein by reference.

FIELD OF THE INVENTION

The present invention relates generally to spatial awareness. More specifically, the present invention is concerned with a system, method and apparatus for the prevention of ground collisions or physical contact between an aircraft or other vehicle being repositioned and nearby objects, such as other aircraft, persons or structures such as hangar walls, doors and outdoor fences when said aircraft being repositioned is taxiing or while being towed or repositioned manually, by a tug, tow or pushback tractor or similar ground-support equipment.

BACKGROUND

Light aircraft weighing less than 3,000 pounds are often repositioned on the ground by means of a manually attached, T-handle tow bar that is clamped to the nose gear. Repositioning is accomplished by one person pulling, pushing and steering the tow bar, sometimes with the help of a second person pushing on some other part of the aircraft while all available persons watch wingtips and tail to reduce the likelihood of collision. Light aircraft are sometimes repositioned by a light motorized tug operated by an operator who has a relatively unobstructed view of surroundings. The likelihood of ground collisions in these situations is low and any damage sustained is often cosmetic in nature, limited to scratched paint.

Heavier aircraft—from light twin-engine aircraft of 5,000 pounds or more as illustrated in FIGS. 1A, 1B and 1C and up to airliners weighing over 1,000,000 pounds—are repositioned on the ground by taxiing under the power of the aircraft's engines or by means of a motorized tug, tow tractor or similar ground-support equipment (tug hereinafter) having an electric motor or internal combustion engine. Some such tugs attach to the aircraft via a tow bar that is clamped to the nose gear, much like the manual tow bar, as illustrated in FIG. 2. Other tugs, especially for mid-sized or larger business aircraft, attach to the aircraft via a lift-cradle arrangement that places a shovel-like metal scoop or cradle in front of the nosewheel as illustrated in FIG. 3. A winch-powered webbing strap wraps around the nosewheel strut and pulls the nosewheel onto the lift cradle until it rocks back, lifting both nosewheel and cradle free of the ground and securing the aircraft to the tug. A pin is then removed from the nosewheel strut's torque link as shown in FIGS. 4A and 4B so that the nosewheel can be rotated without damaging the aircraft's nosewheel steering components. In these instances, the conductive aircraft body is electrically isolated from earth ground by its tires, which may have some electrical resistance, generally tens of megohms, to bleed off static electricity.

Aircraft tugs today are driven by human operators who typically face the aircraft and sit or stand on the tug in a position indicated by steering wheels 201 and 301 as shown in FIGS. 2 and 3, respectively. From this vantage point directly in front of and below the nose of an aircraft, the tug operator's view of the towed aircraft's extremities such as the horizontal stabilizer, vertical stabilizer and wingtips is limited. Depending on an aircraft's tricycle-gear spacing, the aircraft's size, and the orientation of the tug relative to the fuselage, nosewheel motion can be amplified at the aircraft's extremities so that, for example, 1 foot of nosewheel motion might equate to 3 feet of wingtip motion. Also dependent on the angle between tug and aircraft fuselage, the direction of movement of the extremities may be different from nose-wheel direction and difficult for the operator to mentally visualize or predict.

For this reason, two or three "wing-walkers" and the tug driver or aircraft pilot typically work together, with wing-walkers carefully observing and walking along with the wingtips and tail of the aircraft with checking distances to nearby structures such as hangar walls and support beams or objects such as other aircraft or ground-support equipment. These wing-walkers typically carry whistles, walkie-talkies or another means of communicating with the pilot or tug operator should part of the aircraft come near to any physical object.

Nonetheless ground collisions still occur, sometimes because wing-walkers are unavailable, sometimes because they are inattentive or distracted. Commonly known in the industry as "hangar rash," the scars of aircraft ground-towing accidents are a significant issue, repair costs can be quite high, and aircraft down time can be extended.

Accordingly, there is a long-felt and un-met need for apparatuses, systems, and methods for detecting and avoiding ground collisions during the ground movement of aircraft which is adaptable to multiple aircraft.

SUMMARY

The present invention provides apparatuses, systems, and methods for of collision avoidance. In some embodiments, the apparatuses and systems include a first terminal and a second terminal. The terminals are configurable to support electrical connections to one or more vehicles. In some embodiments, a first vehicle is electrically coupled to the first terminal, the first vehicle having one or more electrical characteristic. In some embodiments, the first vehicle is an airplane. In some embodiments, a reference point is electrically coupled to a second terminal, the reference point having one or more electrical characteristic. In some embodiments, via the electrical characteristics, the system determines a proximity between the first vehicle and a nearby object using the one or more electrical characteristics.

In some embodiments, a reference point is the frame of a second vehicle which is electrically isolated from a first vehicle. In some embodiments, the second vehicle is a towing vehicle. Alternative, in some embodiments, a reference point is at least one electrically isolated plate associated with a second vehicle. Yet further still, in some embodiments, a reference point is a conductive surface on which the first vehicle or a second vehicle are configured to move upon.

In some embodiments, the system is configurable to identify deviations of said electrical characteristics and to subsequently warn a user of the system based on said deviations. In some embodiments, such deviations of electrical characteristics correlate to the proportional physical separation distance between a vehicle and one or more objects within an environment. Such electrical characteristics are configurable to be capacitance, inductance, resistance, complex impedance, standing wave ratio, S-parameters, electrical bridge balance, incident power, reflected power and other transmission-line, antenna electrical parameters, lumped-element electrical parameters, frequency-domain, and/or time domain characteristics, or any other electrical characteristics currently known or later developed.

The present invention further contemplates collision avoidance apparatuses and systems utilizing a differential drive circuit coupled to a first vehicle. In some embodiments, the vehicle is an airplane. Such coupling is achieved by a first electromagnetic association. Such electromagnetic association is configurable to be wired or wireless, so by means presently known or later developed. In some embodiments, the circuit acts upon the first vehicle by way of the first electromagnetic association. In some embodiments, the circuit measures a metric associated with the first electromagnetic association to determine the relative spatial position of the first vehicle to an environment. In some embodiments, the system further includes a reference point, wherein said differential drive circuit is coupled to said reference point by a second electromagnetic association. In some embodiments, the differential drive circuit monitors metrics associated with the first and second electromagnetic association, and upon detecting changes the differential drive circuit signals in response to changes in a metric of the first or second electromagnetic association.

The present invention also contemplates methods of collision avoidance. In some embodiments, the method includes connecting a first apparatus to a first vehicle, which may be an airplane, via a first electrical connection and connecting a second apparatus to one or more reference point via a second electrical connection. In such embodiments, the apparatus is configured to measure one or more signal metric from said one or more reference point, and further configurable to monitor the spatial relationship of said first vehicle to an environment by way of changes in said one or more signal metric.

In some embodiments, the reference point is associated with a point disassociated from the first vehicle. In some embodiments, the reference point is the frame of a second vehicle which is electrically isolated from said first vehicle. In some embodiments, the second vehicle is a towing vehicle. The invention contemplates a wide variety of reference points.

In some embodiments, the method is configurable to include monitoring said apparatus for alerts related to said spatial relationship. In some embodiments, while monitoring the apparatus, the method includes moving a first vehicle relative to its environment while continuously monitoring the apparatus for alerts. In yet some other embodiments, the method includes adjusting the movement of the first vehicle based on the status of the signal metric. In some embodiments, the method includes the automatic cutoff of motion based on the signal metric.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

The accompanying drawings, which are incorporated in and constitute part of this specification, illustrate embodiments of the invention, and together with the description, serve to explain the principles of various embodiments of the invention. The embodiments described in the drawings and specification in no way limit or define the scope of the present invention.

Figure 1A:
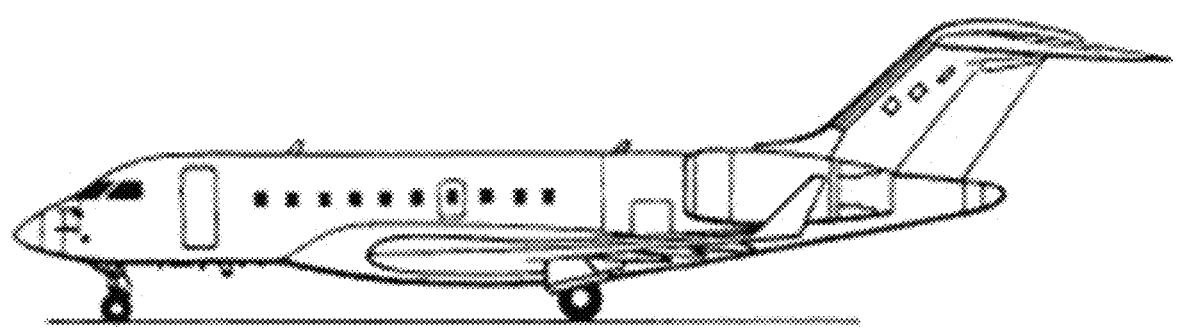
FIG. 1A is a side view of a typical twin-engine jet aircraft.
Figure 1B:
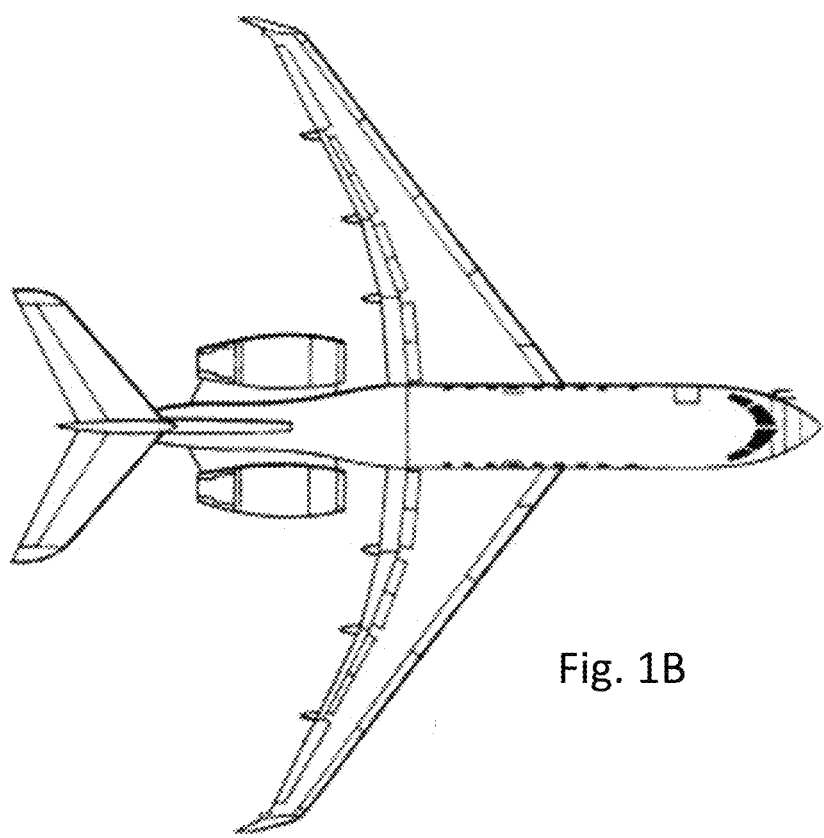
FIG. 1B is an overhead view of a typical twin-engine jet aircraft.
Figure 1C:
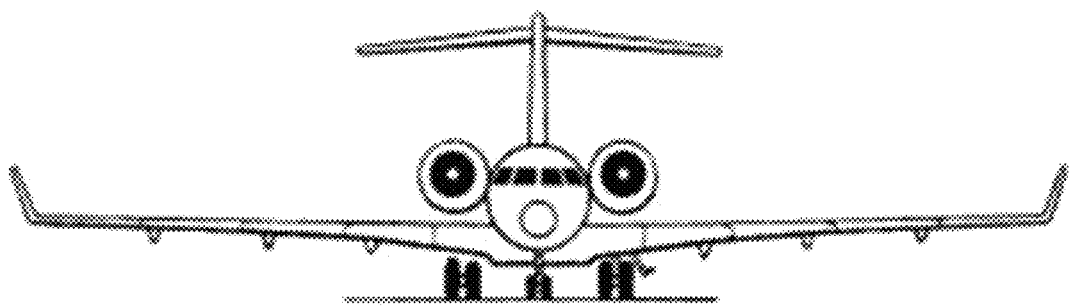
FIG. 1C is a front view of a typical twin-engine jet aircraft.
Figure 2:
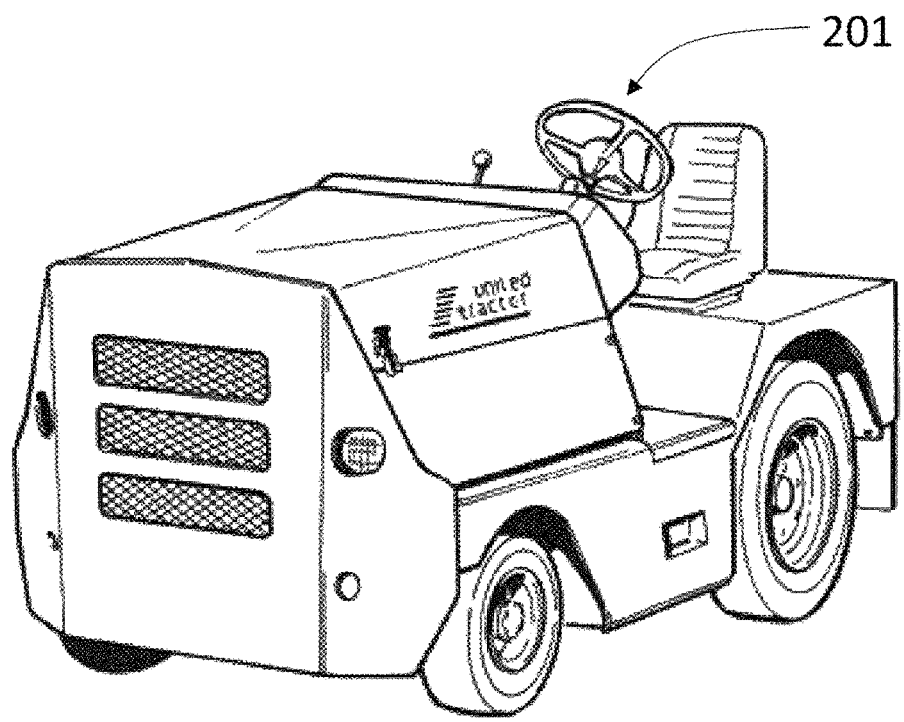
FIG. 2 is a typical motorized aircraft tug with tow bar (not seen) at rear.
Figure 3:
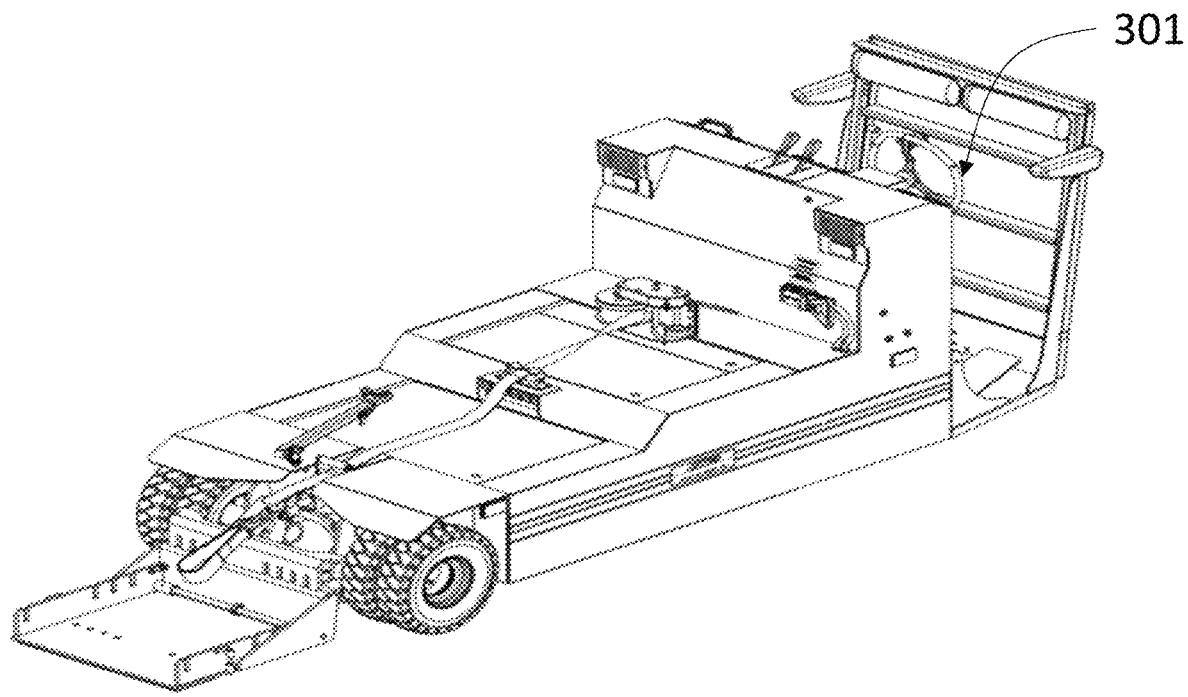
FIG. 3 is a typical motorized aircraft tug employing a front lift cradle.
Figure 4A:
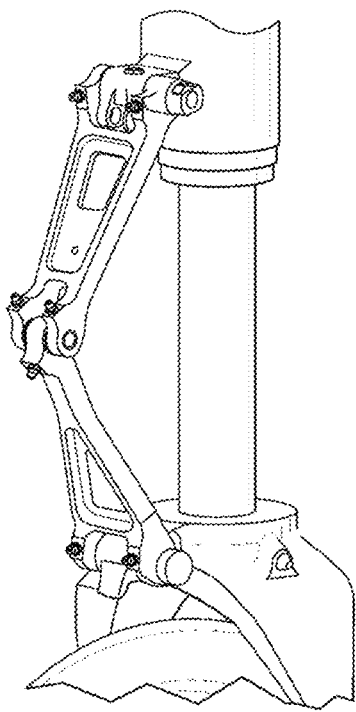
FIG. 4A is a nose-wheel strut with torque link in place.
Figure 4B:
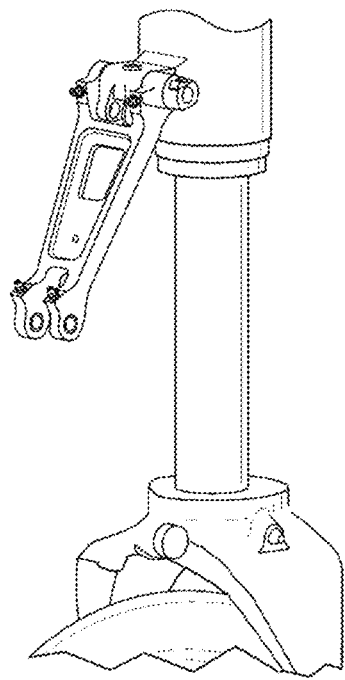
FIG. 4B is a nose wheel strut with torque link uncoupled for towing.

The embodiments of the present invention have been illustrated in all respects to be illustrative rather than restrictive. For example, a person skilled in the art will understand that the elements in the drawings are not limited to the specific dimensions shown, but are for illustrative purposes only. Those skilled in the art will further realize that the embodiments of the present invention are capable of many modifications and variations without departing from the scope of the present invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Embodiments of the invention disclosed herein rely upon measurable shifts in certain electrical characteristics of an electrically conductive aircraft body that is mechanically supported above and electrically isolated from an electrically conductive substrate or ground plane such as earth ground or the metal decks of an aircraft carrier. A fixed-wing aircraft body typically comprises a fuselage, wings, engine nacelles, a horizontal stabilizer and vertical stabilizer, and these measurable shifts occur in response to and in proportion to changes in the separation distance between any part of the aircraft body and any nearby object or structure, which may include other aircraft, ground-support equipment, the walls and doors of an aircraft hangar or even people, so long as that nearby object or structure is conductive or has a permittivity or dielectric constant that is substantially different than that of the surrounding medium, which is typically air.

Said nearby objects need not be electrically grounded as in the case of other aircraft. Said nearby object need not be conductive, as in the case of a sheet-rock wall, so long as the object's permittivity is different than from the free-space permittivity constant commonly known as epsilon naught. The external surface of the aircraft being repositioned need not be electrically conductive so long as the aircraft is conductive underneath the surface, as is the case with painted metal aircraft or composite aircraft certified for flight under instrument flight rules (IFR) according to the certification guidance mentioned in FAA circular AC 20-107B and found in SAE Aerospace Recommended Practice (ARP) 5577.

In embodiments of the invention, a stimulus signal is applied to the aircraft or parts thereof by an apparatus that may be internal or external to the aircraft. Sensing circuitry responsive to changes in the capacitance, impedance or balance with respect to ground of the aircraft body or one or more parts thereof or of any equipment or apparatus attached thereto triggers an alerting signal. The alerting signal may be of any form including but not limited to audible, visual, tactile or haptic. Such alerting signal may be emitted by the sensing device directly, or the alerting element may be hardwired or coupled wirelessly to the sensing apparatus, and thus may be local or remote. The proximity alerting signal may be on/off, or it may be proportional in frequency, color, magnitude, repetition rate or other characteristics to the physical separation distance between the aircraft and any nearby objects. In response to alerts, aircraft movement may be halted, thereby preventing physical contact between the aircraft body and any nearby objects or structures and preventing damage or harm to either.

The measurable electrical characteristics of the electrically conductive aircraft body above an electrically conductive substrate include at least capacitance, inductance, transmission-line impedance, electrical losses, the dielectric losses, radiation losses associated with the aircraft body acting as antenna coupling electromagnetic energy into free space. Embodiments of the invention differentially drive or otherwise couple energy into one part of the aircraft with respect to another part, such as the port wing section with respect to the starboard wing section, or the tail section with respect to the wing as a whole, then sense minute electrical imbalances with respect to ground or external objects.

The sensing apparatus may be built into the aircraft or retrofitted thereto, or it may be attached to or built into a tug or tow tractor.

Dual Slope Capacitance Measurement

Figure 5:
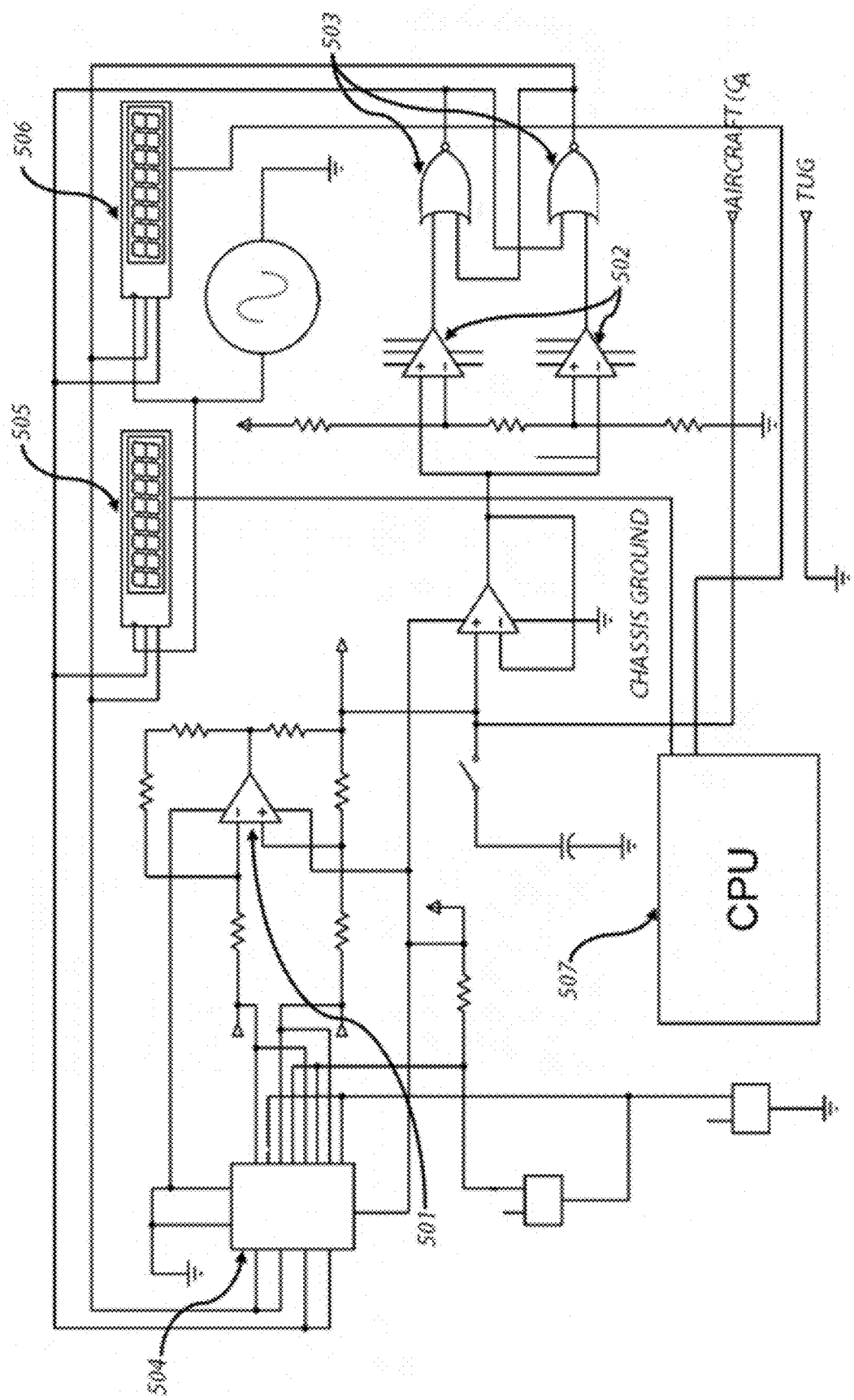
FIG. 5 is an electrical schematic diagram of a dual-slope-integration type capacitance measurement circuit.

FIG. 5 illustrates a dual-slope integration capacitance measurement circuit. A high-impedance, bidirectional precision constant current source comprising op amp 501 and surrounding precision resistors charges the aircraft-body capacitance CA to a threshold voltage, which triggers dual voltage comparator 502, triggering a dual-NOR gate SR flip-flop 503, forcing one output to a logic low. A low at the control input of analog switch 504 causes the polarity of the current-source inputs to reverse, causing the current source to discharge aircraft capacitance CA until its voltage crosses the comparison threshold of the other half of comparator 502. A high on the output of that half of comparator 502 causes a low at the output of one of the NOR gates 503, causing analog switch 504 to again reverse the polarity of the voltages input to the current source, thus switching it from a discharge mode back to a charge mode.

This cycle repeats at a rate or frequency determined by the current setting of the current source and the value of aircraft capacitance CA. A first digital counter 505 counts the length of time that the output of one half of NOR gate 503 is low, and a second digital counter 506 counts the length of time that the output of the other half of NOR gate 503 is low. Independent running averages of multiple counts from each of these two counters can be computed within attached CPU 507 to narrow the measurement system bandwidth and reduce the effects of noise, such as impulse and random noise picked up by the aircraft body acting as an antenna. Given that these counts are digital or numeric in nature, other DSP (digital signal processing) filtering can be applied to minimize the effects of noise and to improve system precision in sensing minute changes in aircraft body capacitance, such as FIR filters, IIR filters, Kalman filters, window functions and others.

Absent external influences such as the presence of nearby electrically charged clouds passing an aircraft that is parked outdoors or other external sources of charge, including triboelectric charge accumulation caused by cold, dry winds flowing over and around the aircraft body and discharge or bleeding of accumulated charge via conductive tires or wire connections to earth ground, charge and discharge times should be equal, assuming great care is taken to ensure that charge and discharge currents are precisely equal. By comparing up counts with down counts, either on an instantaneous basis or a time-averaged basis, the presence of external charge influences can be determined. Such count imbalance might warn of an approaching thunderstorm or other hazards, an ancillary benefit to using the dual-slope integration method.

The dual-slope integration method is one embodiment of a precision capacitance-measurement circuit, and the dual-slope integration implementation illustrated in FIG. 5 is but one implementation of the dual-slope method. Other methods of capacitance measurement can be used to practice the invention as well, and some of these are described in this disclosure. These include but are not limited to single-slope integration, relaxation oscillators based on resistors and capacitors (R/C), inductor-capacitor (L/C) oscillators, capacitance bridges, bidirectional electron counting by means of arrangements of at least three quantum dots and other methods. The invention is not reliant upon a particular method of capacitance measurement.

Tug-Aircraft Modeling and Connectivity and Tug Neutralization

Isolated conductive bodies exhibit a self-capacitance that is proportional to external surface area. Charge can be accumulated on such an object if it is isolated in a non-conductive medium such as air, a vacuum or, for example, within an insulating layer of semiconductor material. It is estimated that the earth, a large sphere isolated in the vacuum of space, has a self-capacitance of approximately 700 µF (microfarads).

When two conductive plates are separated by an insulting medium, the plates exhibit mutual capacitance with respect to each other, and it is possible to place a charge on one plate with respect to the other. It is the mutual capacitance of the aircraft body with respect to earth ground and other surroundings upon which the invention is based.

In an embodiment of the invention, the mutual capacitance of the aircraft body with respect to earth ground and any nearby or proximate objects such as a hangar or other aircraft, all of which collectively form the second conductor of the aircraft as capacitor. In order to measure the capacitance of the aircraft body with respect to earth ground, the aircraft body is one terminal of the capacitor and earth ground is the other. Given that a purpose of the invention is to determine when the aircraft is nearing a structure or object while being towed on the ground, connection to earth ground could be accomplished by means of a long cable strung behind the tug, which, while inconvenient, is included as one element of an embodiment of the invention.

Included therefore as an element of a preferred embodiment of the invention is a method of coupling to earth ground without physically attaching to it with such a conductive wire trailing behind or otherwise electrically connected between the tug and earth ground. Several methods will be described herein, including electrically isolating the tug from the aircraft body to which the aircraft body is mechanically attached and utilizing a conductive or capacitive coupling between the tug and the ground or deck surface upon which it operates, typically bare or painted concrete or bare asphalt, but including metal flooring, as in the flight deck, elevator and hangar decks of naval aircraft carriers. In this way, the aircraft body is attached to one terminal of the measurement apparatus and the tug is attached to the other.

Included as an element of an embodiment of the invention is the method of electrically attaching the aircraft body to the tug to which the aircraft is mechanically attached, connecting the electrically connected tug-aircraft system to one terminal of the capacitance-measuring apparatus and trailing a conductive wire, plate, webbing, chainmail or similar material behind or underneath the tug so that it forms a conductive connection to earth ground. Similarly, the trailing material may be insulative rather than conductive, having a conductive backing that is attached to the reference terminal of the capacitance-measuring apparatus.

If the mutual capacitance between the aircraft and effective earth ground [define earlier as earth and surroundings] is on the order of 500 pF (picofarads), depending on aircraft size and height above ground, while the mutual capacitance between the tug and the effective earth ground, owing to reduced plate-separation distance δ is on the order of 5,000 picofarads, a difference of 10×, then the mutual capacitance $C_{composite}$ of the two in series is given by $$C_{composite} = \frac{1}{\left(\frac{1}{C_a} + \frac{1}{C_t}\right)}$$

where Ca is the aircraft capacitance and Ct is the tug capacitance. Calculations show that though Ct is 10× larger than Ca, the effects of equivalent changes in capacitance vary by nearly approximately 100×. By way of example, if Ca is 500 pF and Ct is 5,000 pf, the combined series capacitance $C_{composite}$ is approximately 454 pF. In order to effect a change of 1 pF in effective series capacitance $C_{composite}$, it is necessary to change Ca by only 1.2 pF. To effect a change of 1 pF in effective series capacitance, it is necessary to change Ct by 120 pF, a 100× increase. Thus, it is shown that the apparatus is much more sensitive to changes in aircraft capacitance than to tug capacitance. By making Ct large, the system can thus be desensitized to small changes in the coupling capacitance between the tug and the local effective earth ground.

For capacitance-measurement embodiments of the invention, rather than making Ct the tug-to-effective earth ground capacitance large relative to the aircraft-to-effective earth ground, there are other methods for minimizing the effect of Ct on the desired measurement, Ca and these are incorporated as elements of an embodiment of the invention.

Tug capacitance Ct can be measured and calibrated out of the equation statically by first measuring the capacitance between the tug and the effective earth ground system with the tug in a stationary position prior to use of the apparatus in motion to sense changes in Ca.

Figure 6:
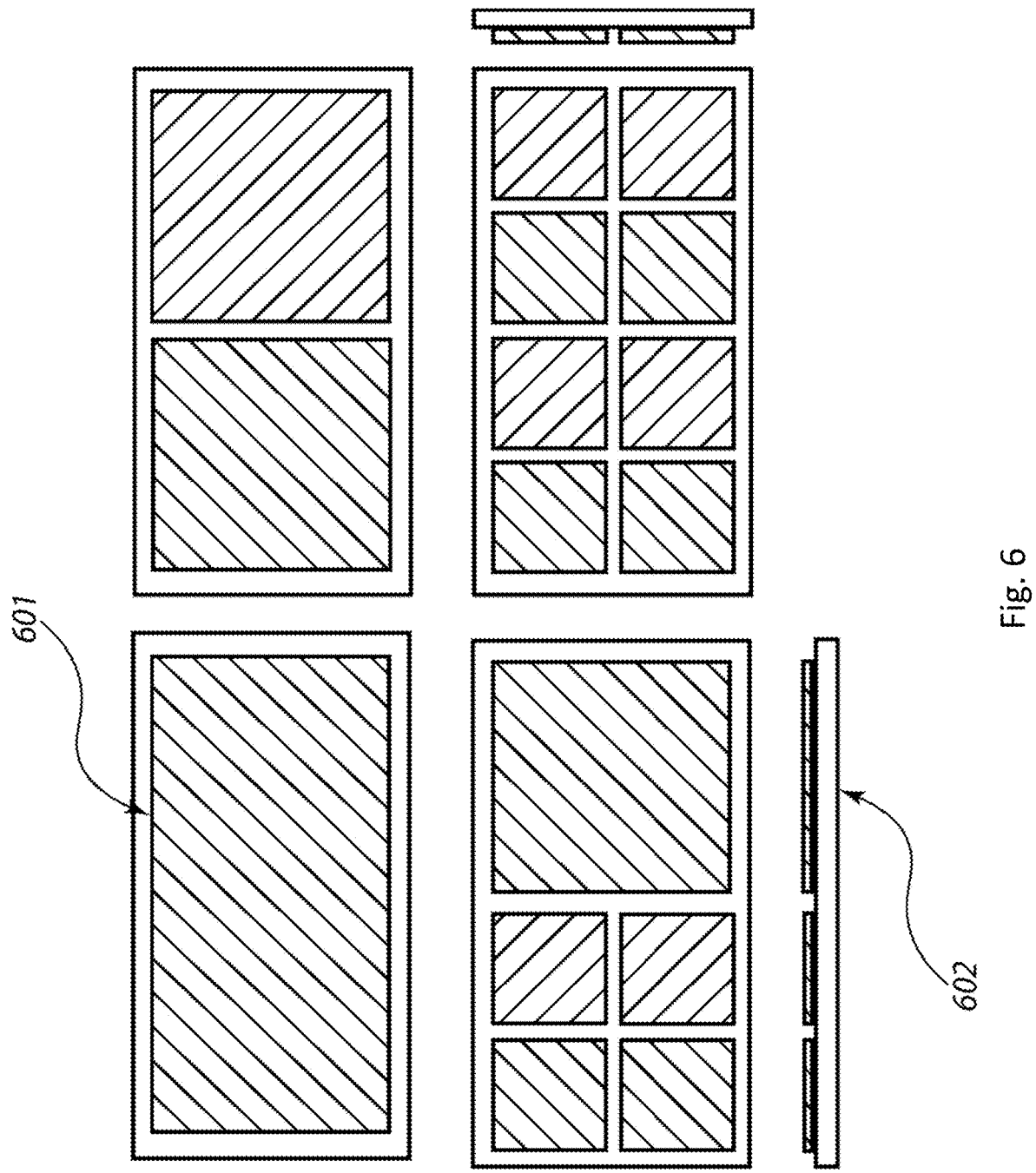
FIG. 6 is a front and side view of four arrangements of conductive plates on dielectric substrates.

Tug capacitance Ct can be measured and calibrated out dynamically by means of a plurality of coupling plates as illustrated in FIG. 6 with multiple embodiments that include arrangements of 1, 2, 5 and 8 cross-hatched conductive plates 601 on an insulating dielectric substrate 602, or conductive plates suspended below the tug by insulating standoffs so that the plates are electrically isolated from the tug by a dielectric of air or another insulating material. In this tug-calibration embodiment, an arrangement of isolated, conductive plates, perhaps etched on a fiberglass-epoxy printed circuit board, is placed on the underside of the tug. A capacitance-measurement apparatus as described herein measures the mutual capacitance between one conductive plate and at least one other conductive plate. By this method, changes in the tug to earth-ground system capacitance are made continuously and dynamically.

According to yet another embodiment of this neutralization or cancellation method, a flexible plate on the underside of the tug is mechanically flexed by means of a solenoid or acoustic loudspeaker, by a mechanically attached motor with an off-center weight attached to its shaft or other actuator in combination with or not in combination with weights attached to the flexible plate so that the plate resonates and is "pumped" by the actuator. In this way, calibrated shifts in tug capacitance Ct are made at a known fixed frequency so that these can then be dynamically compensated out of the Ca-Ct system capacitance.

For embodiments of the invention that measure the impedance of an aircraft body as a function of RF frequencies, the tug-to-ground capacitance Ct can be neutralized by inductors internal to the apparatus that are electrically in series with the tug body. In this way, the capacitive reactance of Ct at a specific frequency is cancelled out by a series inductance that has an equal inductive reactance at that frequency. Neutralization of tug capacitance across a broad range of frequencies can be accomplished with a bank of inductors that are switched in and out of the circuit by relays or electronic switches.

Figure 7:
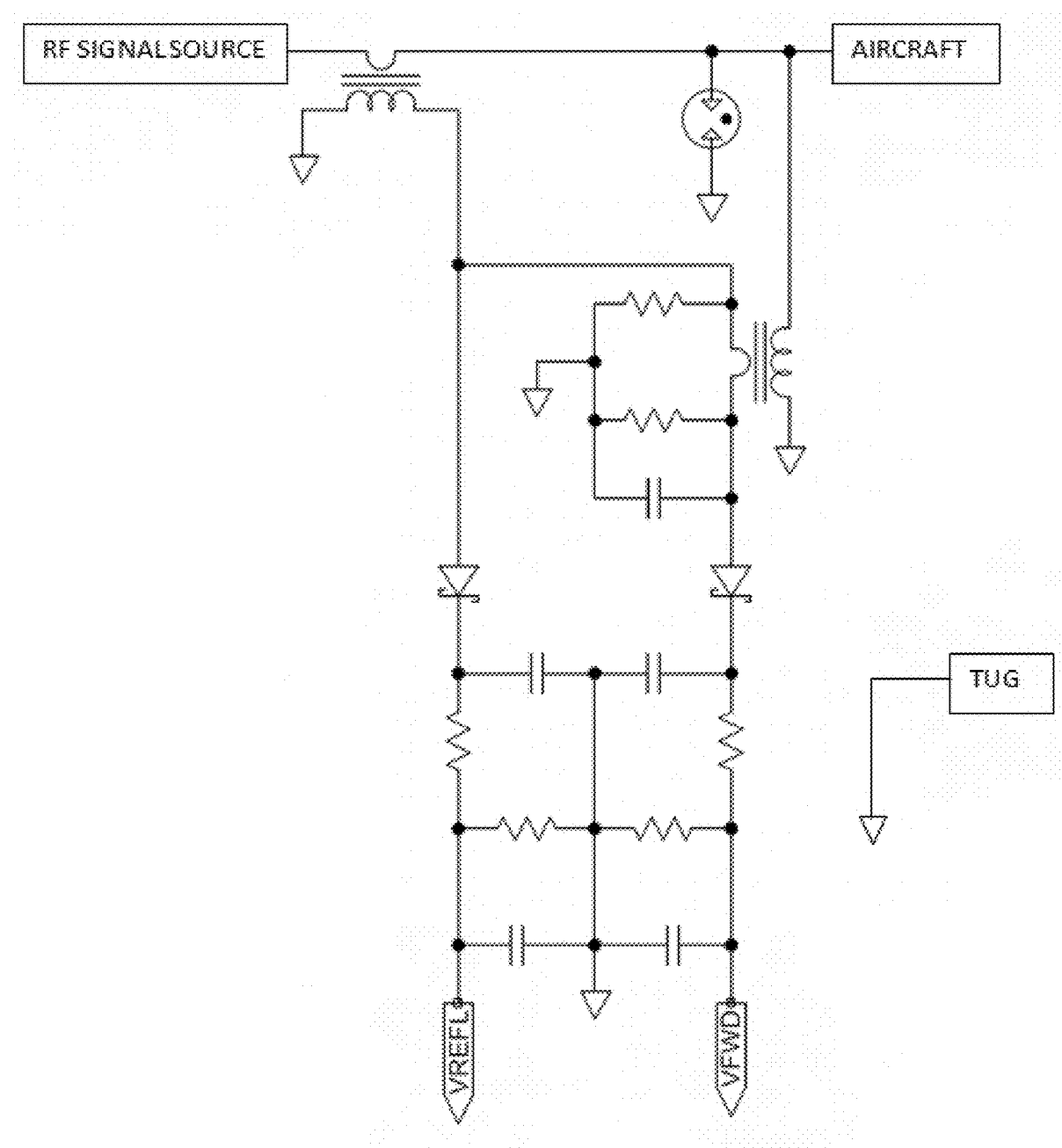
FIG. 7 is an electrical schematic diagram of a scalar impedance bridge.
Figure 8:
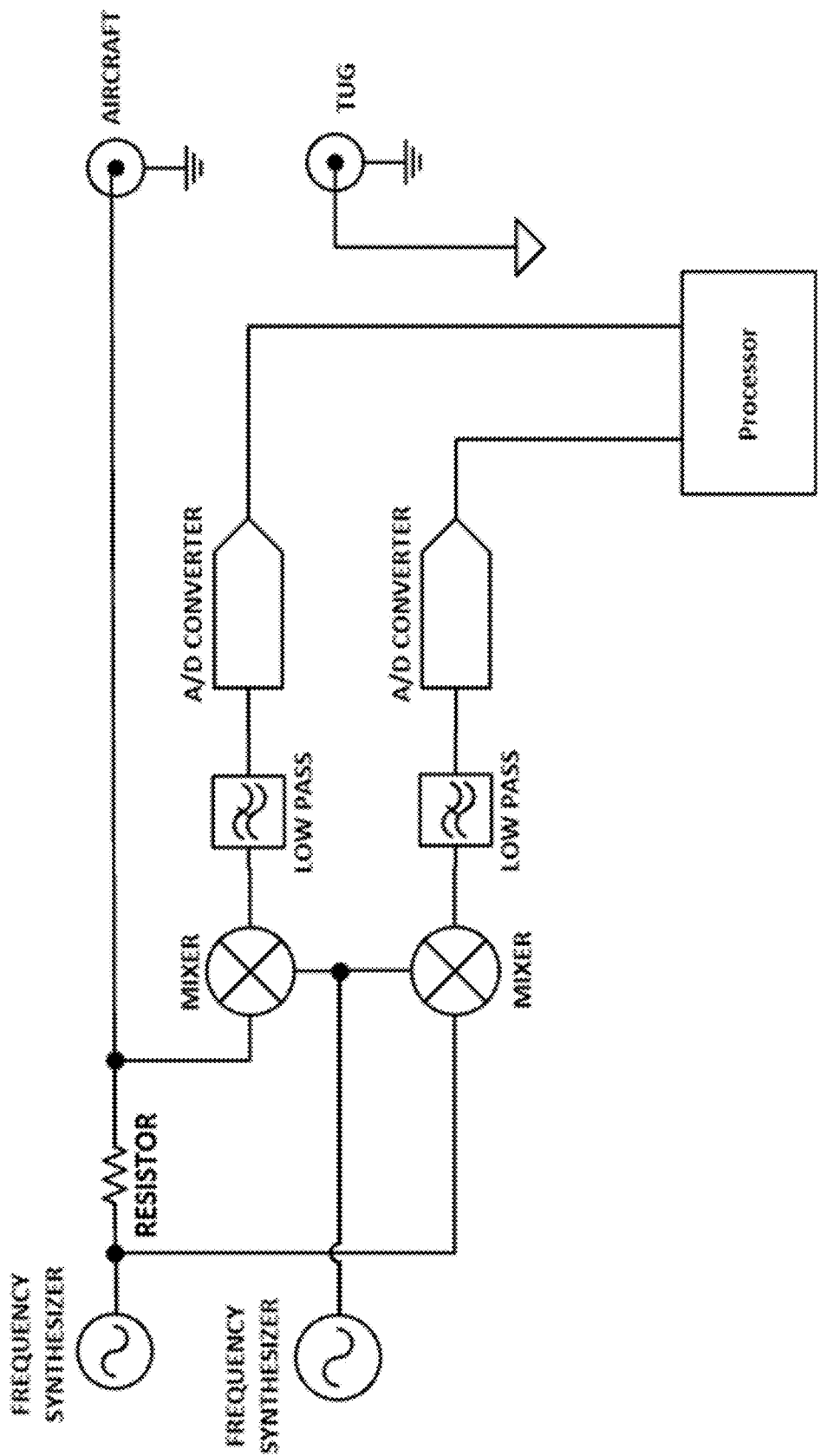
FIG. 8 is an electrical block diagram of a vector impedance bridge.
Figure 9:
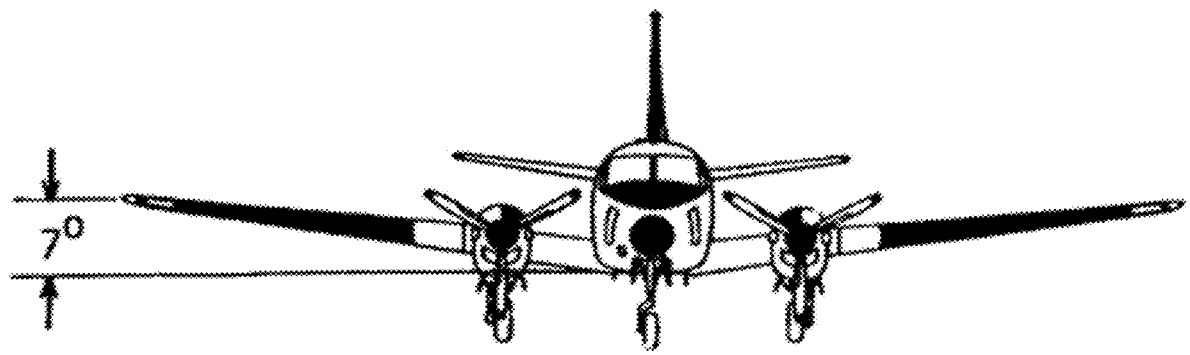
FIG. 9 is a front view of a twin-engine propeller aircraft with upward dihedral.
Figure 10A:
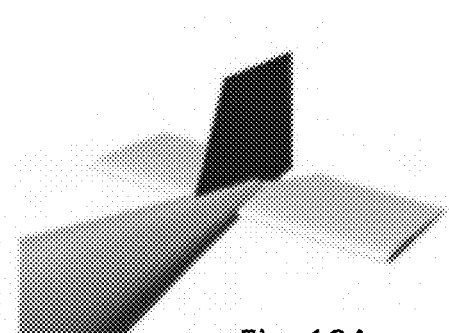
FIG. 10A is a perspective drawing of a conventional aircraft tail section.
Figure 10B:
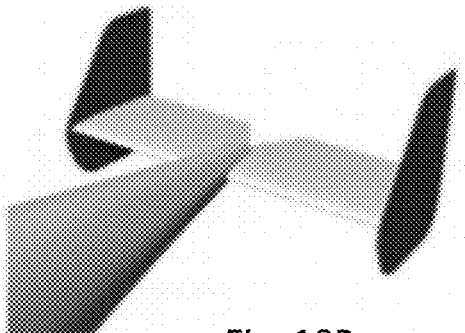
FIG. 10B is a perspective drawing of an aircraft tail section with twin vertical stabilizers.
Figure 10C:
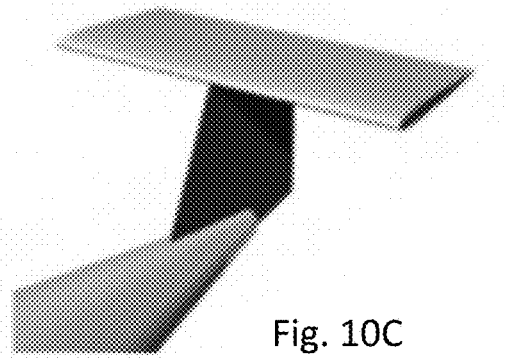
FIG. 10C is a perspective drawing of a T-type aircraft tail section.
Figure 10D:
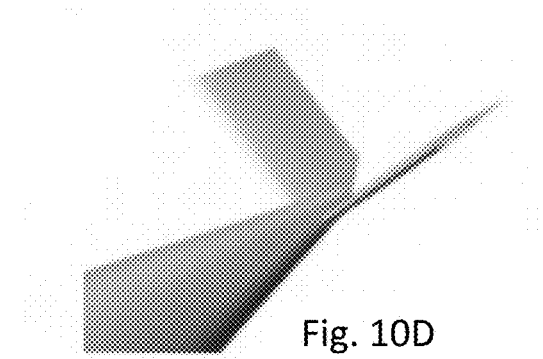
FIG. 10D is a perspective drawing of a V-type aircraft tail section.
Figure 11:
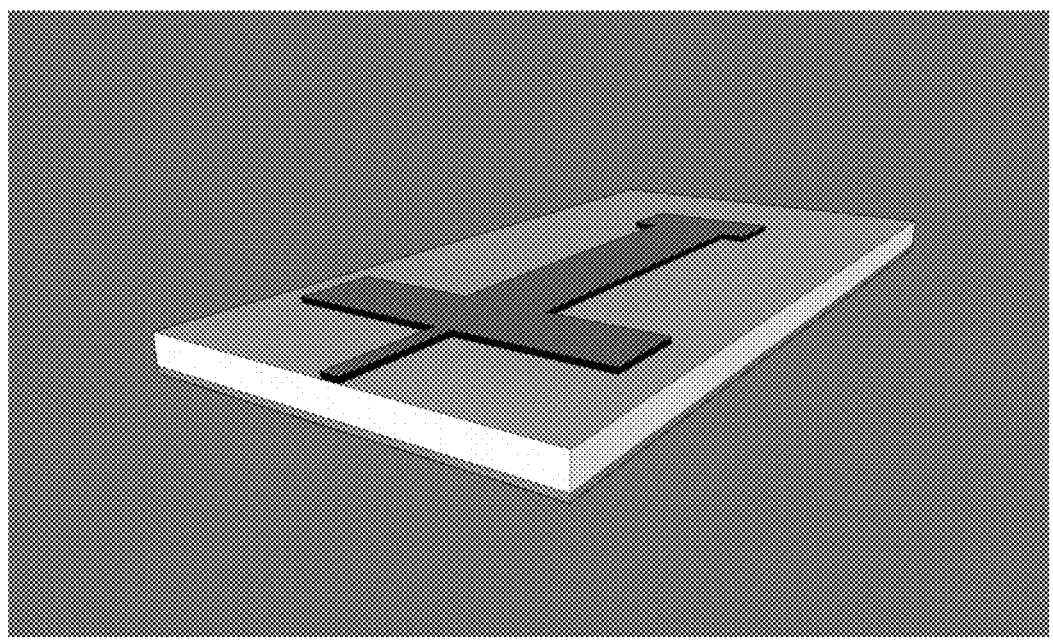
FIG. 11 is a perspective drawing of a microstrip model of an aircraft.

Embodiments of the invention includes an apparatus for determining aircraft proximity to conductive or dielectric objects and structures by measuring the aircraft's scalar or complex impedance at one or more AC (alternating current) or RF (radio frequency) frequencies and triggering alerts when changes in impedance exceed preset thresholds. Scalar and vector measurement apparatuses are shown in FIGS. 7 and 8 respectively. Owing to physical characteristics of each aircraft such as wingspan and wing dihedral angle as shown in FIG. 9, height of the fuselage above the ground, tail height and tail type, including conventional, H, T, and V tail types as shown in FIG. 10, width of the horizontal stabilizer and other distances and dimensions, a given aircraft type parked or resting on a theoretical infinite conductive sheet is effectively both a microstrip transmission line, shaped as shown in FIG. 11 and a microstrip antenna when driven at a point or points of electrical contact, such as the nose or nosewheel strut, by an RF source that possesses a characteristic impedance, such as an RF signal generator. As such, the aircraft body will radiate RF energy efficiently at frequencies where its characteristic impedance matches that of the RF source. Likewise, the aircraft body will not radiate RF energy efficiently at frequencies where the impedance of the aircraft body differs substantially from the characteristic impedance of the RF source, which is to say, at such frequencies where there is impedance mismatch, a considerable percentage of the RF power that is incident upon the aircraft from the RF source will be reflected back to the source.

Figure 12:
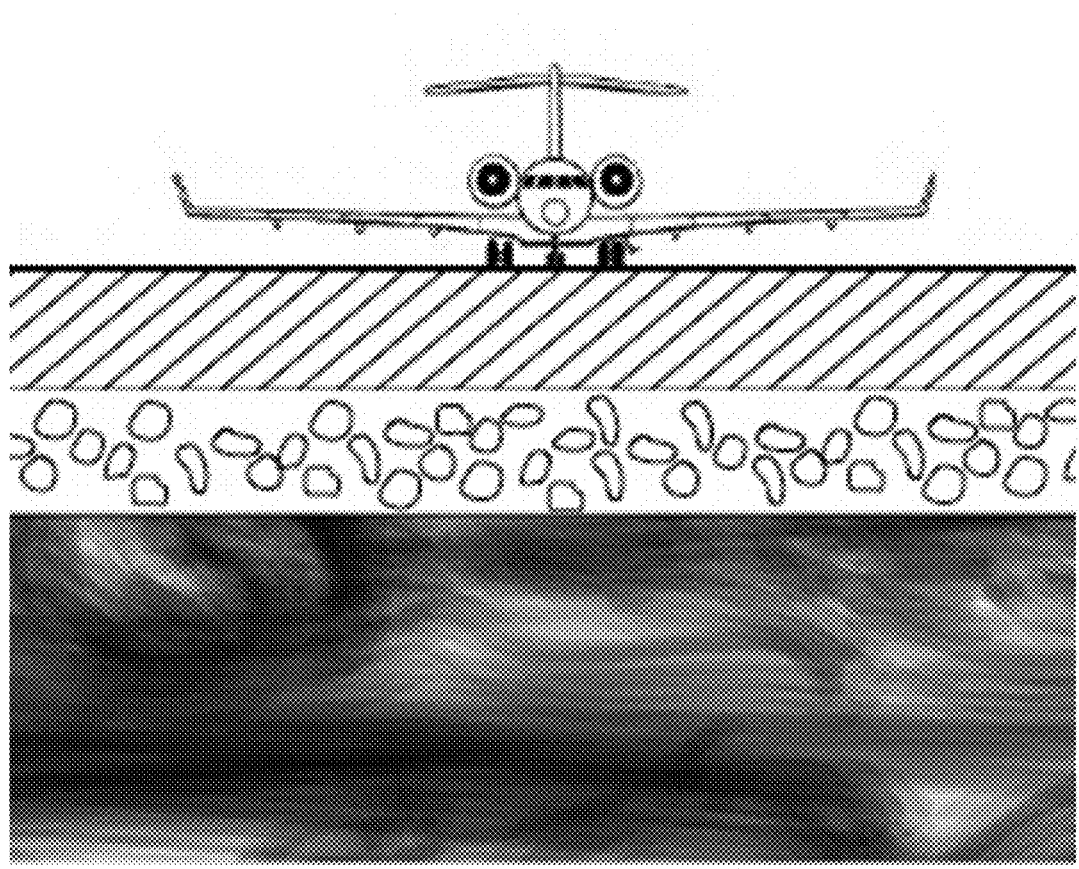
FIG. 12 is a front view of a twin-engine jet aircraft above a sectional view of typical airport hangar/parking ramp construction materials with concrete and then stone ballast above soil or sand.

When the aircraft is parked on a conventional surface such as steel-reinforced concrete or asphalt that is more lossy or resistive than a hypothetical infinite conductive sheet as shown in FIG. 12, the effective Q of the aircraft body, that is, the reactive or imaginary impedance divided by the real or resistive impedance, will be lower and any sharp peaks or nulls in a plot of impedance versus frequency will be broadened as a result. The rate of change of phase as a function of frequency will be reduced, and overall sensitivity to the movement of nearby object or structures may be diminished.

It is also anticipated that when an aircraft is inside a hangar that waveguide effects will be observed as the entire hangar functions as a waveguide in certain modes, such as TE10 (transverse electric, m=1; n=0) mode for example, for frequencies above the mode-cutoff frequency, with the aircraft functioning as a driven element as in a coaxial adapter and the open hangar doors allowing electromagnetic energy to radiate into free space. With the hangar doors closed, the hanger may also exhibit resonant-cavity modes with sharp resonances at certain frequencies. Given the large size of many general-aviation hangars, cavity resonance frequencies may be quite low, well below the microwave frequencies where waveguide is typically used. Any or all of these circumstances may be used to advantage in determining the aircraft's proximity to nearby objects by observing changes in phase, amplitude and group delay (time) between incident and reflected RF power.

In terms of the S-parameter elements comprising the scattering matrix:

$$\begin{bmatrix} S_{11} & S_{12} \\ S_{21} & S_{22} \end{bmatrix}$$

given by where $$\begin{pmatrix} b_1 \\ b_2 \end{pmatrix} = \begin{pmatrix} S_{11} & S_{12} \\ S_{21} & S_{22} \end{pmatrix} \cdot \begin{pmatrix} a_1 \\ a_2 \end{pmatrix}$$

a_1 is the incident wave impinging upon the aircraft body as transmission line/antenna from a signal generator portion of an embodiment of the invention, and $b_1$ is in this instance the reflected wave, whose phase and amplitude are compared with the phase and amplitude of the incident wave to arrive at complex impedance.

Figure 13:
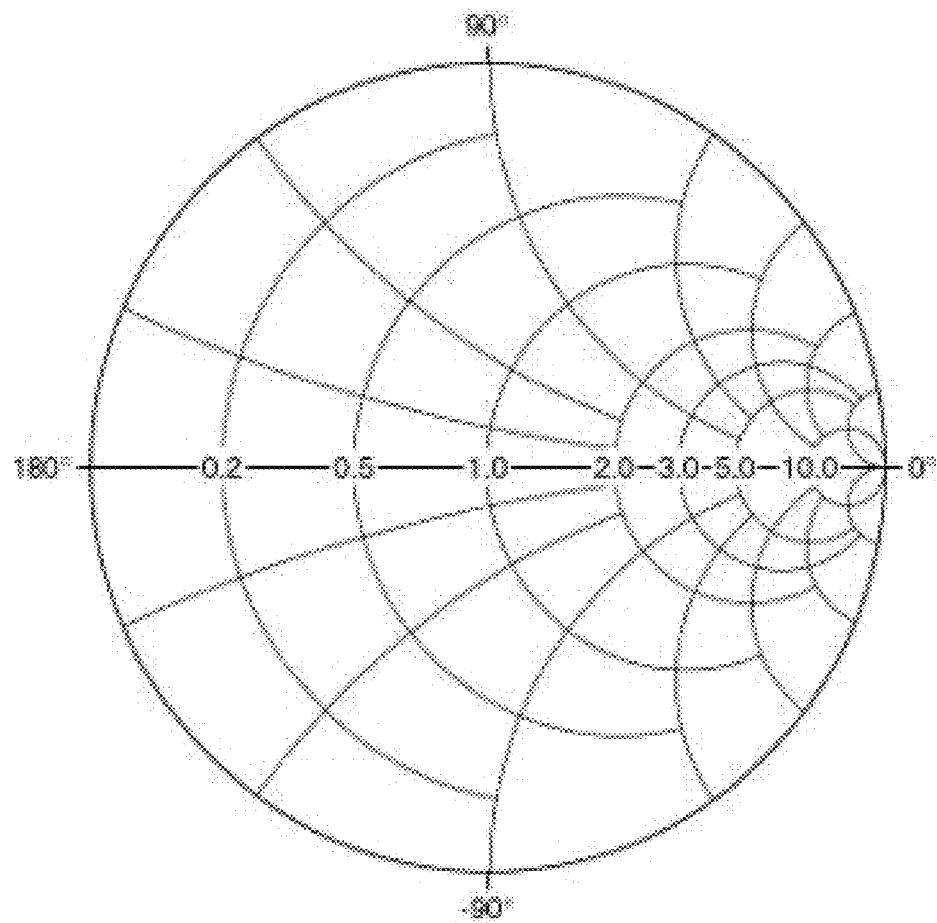
FIG. 13 is a Smith chart commonly used to match one radio-frequency impedance to another.

The measurement described above is of the parameter $S_{11}$ or voltage reflection coefficient. $S_{11}$ can be transformed by mathematical manipulation to any of: VSWR, the voltage standing wave ratio also known simply as SWR, which is generally represented as a scalar value; any of the other various network-parameter sets, including but not limited to Y, Z, H, T and other parameters; return loss, another scalar value expressed in dB; and complex impedance as expressed in the form of series- or parallel-connected resistive-inductive or resistive-capacitive elements as might be represented on a Smith chart, see FIG. 13, which is a circular impedance chart created by folding the vertical or imaginary axis of an x-y impedance plot back on itself.

With one or more nearby receive antennas external to and apart from the aircraft and with the aircraft body serving as radiator, or with such antennas external to the aircraft acting as transmitters or intentional radiators and with the aircraft body serving as a receive antenna, three of the four S-parameter values could be measured as well in an embodiment of the invention and aircraft proximity to nearby objects and structures deduced therefrom, namely $S_{11}$, $S_{12}$ and $S_{21}$. The fourth S-parameter $S_{22}$ has no significance in this measurement context.

In yet another embodiment of the invention, variations in the levels of ambient signals and environmental noise impinging upon the aircraft are used to infer changes in aircraft proximity to nearby objects and structures by observing shifts in amplitude peaks and valleys as well as phase shifts.

Figure 14:
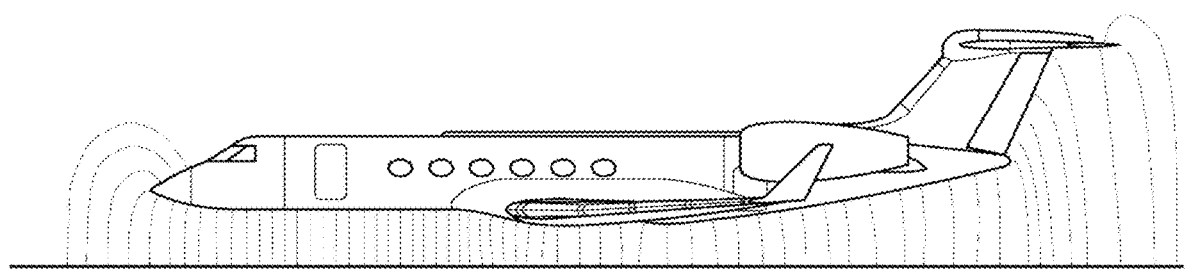
FIG. 14 is a side view of a typical twin-engine jet aircraft above an electrically conductive surface with representative lines of an electric field caused by a difference of the electric potential between the aircraft body and the conductive surface below.

In addition to exhibiting capacitance, an aircraft body forms a microstrip transmission line in that it is a conductive surface (the aircraft body) above a ground plane (a hangar or ramp floor) separated from the ground plane by a dielectric (air) with lines of electric flux emanating as shown in FIG. 14. These microstrip effects are observed when the aircraft is electrically excited with radio frequency signals. Where a part of the aircraft body such as a wing is ¼ wavelength at a specific frequency, power that is incident upon the wing via the fuselage will be reflected by the wingtip, which is an electrically an open circuit, just as would a length of coaxial transmission line that is ¼ wavelength in length and open at the far end. Like the ¼-wavelenth open transmission line, the ¼-wavelength open wingtip will appear as a short circuit at the fuselage. Unlike coax, a ¼-wavelength wing will also function as an antenna, with an increased sensitivity to nearby objects owing to the stronger electric field in the vicinity of the wingtip. Likewise, the wing root may display diminished though not zero sensitivity to nearby objects, because of the decreased electric field strength and increased magnetic field strength near the wing root, as does the base of a ¼-wave monopole antenna. The ¼-wavelength wing will also radiate more, because the dielectric between the wing and the microstrip ground-plane is part air, the dielectric medium that surrounds the wing on all sides, and part ground, primarily the upper layer of the concrete or asphalt and below it, the bedding and soil beneath.

Similarly, an aircraft body acts as a patch antenna in that it is a conductive surface with extremities (a wing intersecting the fuselage) and a tail that will radiate radio-frequency energy at certain frequencies where those extremities are resonant, such as those frequencies where the length from the nose the tail is ¼ wavelength or an odd multiple thereof. At such frequencies, the aircraft body may appear resistive or, in mathematical terms, as a real impedance with little or no imaginary part.

These dual behaviors as transmission line and antenna are intertwined but need not be separated. Transmission-line and antenna characteristics are measurable by a one-port device such as the vector impedance bridge illustrated in FIG. 8, which is connected to a fixed point on the aircraft, generally the nosewheel strut assembly, and measures the aircraft's impedance with respect to earth ground or a suitable ground-reference point, such as a tug or a plate. Inferences can then be made about the proximity of the aircraft body, particularly its extremities, to nearby objects and structures by measuring changes in the impedance of the conductive aircraft body at a specific frequency or over a range of frequencies, which may be covered in a continuous or discontinuous sweep, in discrete steps, in random nonrandom or pseudorandom hops or any other pattern. Changes in impedance can be measured sequentially in time by means of RF signals of swept or stepped frequencies generated by a phase-locked loop (PLL) frequency synthesizer or by a direct digital synthesizer (DDS). Superior measurement accuracy and therefore the best correlation between perturbations between incident and reflected power will be delivered when the excitation signal is sinusoidal and relatively free of harmonic energy and spurious signals. The RF signal output from readily available DDS integrated circuits have harmonic and spurious signals lower than 65 dB below the desired carrier, and this is sufficient.

Impedances at multiple frequencies can be measured simultaneously by means of a multicarrier orthogonal frequency division multiplexed (OFDM) excitation signal or other broadband signal and a bank of receivers, so long as no nonlinearities are introduced that might result in intermodulation. Such processes are most easily using software defined radio (SDR) techniques coded in digital signal processing (DSP) algorithms or in digital signal processing hardware implemented in field-programmable gate arrays (FPGAs) or as custom logic or mixed-signal circuitry in an application specific integrated circuit (ASIC). Less practically, such OFDM techniques So long as the subject aircraft remains a safe distance, typically one to two meters, away from nearby structures and objects, no significant changes in the impedance of the aircraft are seen other than those caused by shifts in Towing Angle and minor variations caused by inhomogeneities within the first several feet of the substrate or rolling surface upon which the aircraft is being repositioned, including the surface. In certain embodiments of the invention, shifts due to Towing Angle 1501, illustrated in FIG. 15, can be compensated for as described elsewhere within this specification. Inhomogeneities upon or within the rolling surface can be compensated for by means of the sensor suite, which reports various parameters including exact position or geolocation to a microcontroller, which in turn can share any and all such information with the Digital Signal Processor as shown in FIG. 16.

When a part of the aircraft body, particularly one of the extremities, approaches an object or structure, changes will occur in the measured impedance as a function of frequency, and the scalar shifts in impedance or vector shifts in resistance, capacitive reactance and inductive reactance. These changes can be interpreted and used to trigger alarms that are audible, visible or both. The alarms may be simple on-off indications such as activating an alarm tone or bright LED, or may be proportional so that, as the aircraft moves closer to an object, the occurrence rate of short beeps, their pitch or both increase as do the clicks of a Geiger counter nearing a radioactive source.

Figure 17A:
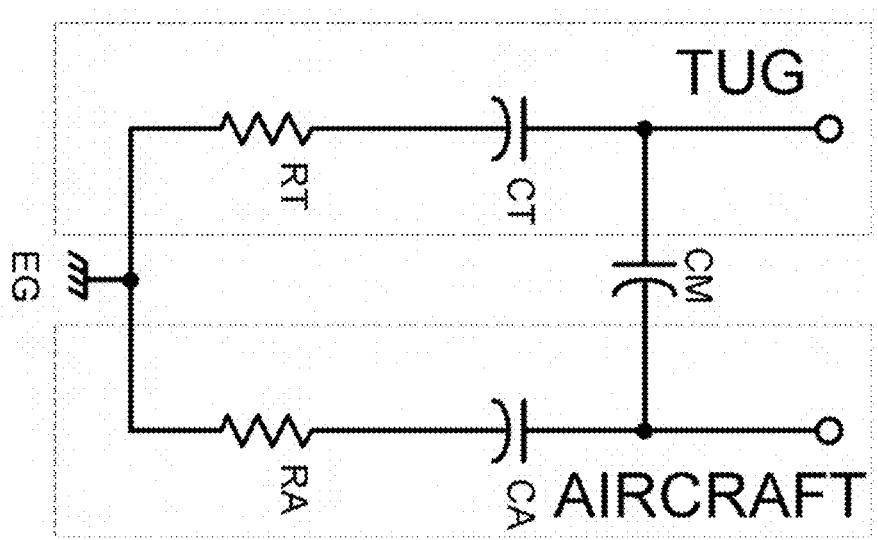
FIG. 17A is a three-terminal electrical schematic diagram model of an aircraft attached to a tug with a hangar floor or ramp surface as ground plane.

The aircraft-body/earth-ground/tug system is diagrammed in FIG. 17A. This attaches to a two-terminal embodiment of the measurement apparatus that is central to the invention, such as the vector impedance measurement apparatus diagrammed in FIG. 8. Cm is the mutual capacitance between the tug and aircraft, Ct is the mutual capacitance between tug and earth ground and Ca is the mutual capacitance between aircraft and earth ground. Rg is the resistance of earth ground. Relative to Ca, Cm is relatively small and is dependent upon the physical sizes of the aircraft being towed and the tug. Since aircraft and tug size are fixed, Cm is relatively invariant over short periods of time, with minor shifts related to air temperature and humidity, inhomogeneities in ground materials and similar factors. Cm may vary significantly with shifts in the aircraft/tug Towing Angle 1501, which is illustrated in FIG. 15.

Figure 15:
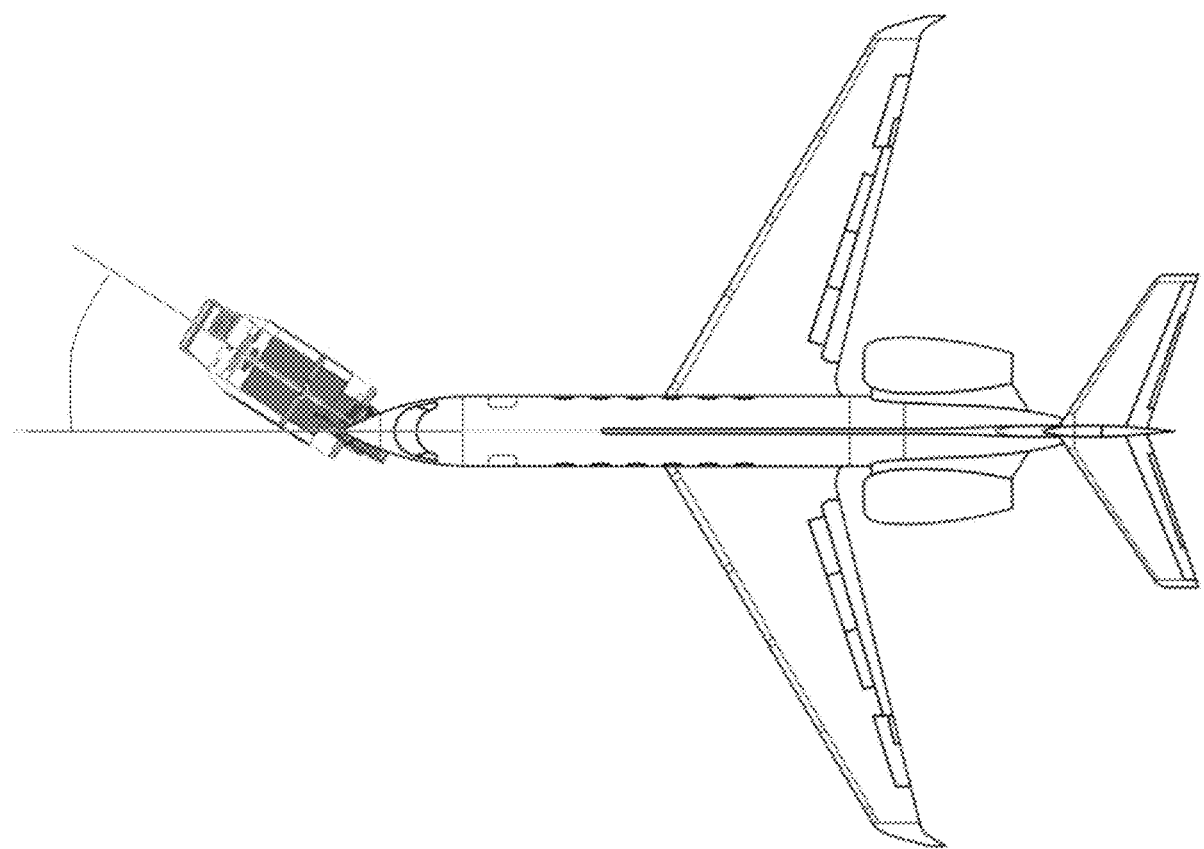
FIG. 15 is a typical twin-engine jet aircraft with tug or tow tractor attached to its nose gear illustrating the towing angle between aircraft and tug.
Figure 16:
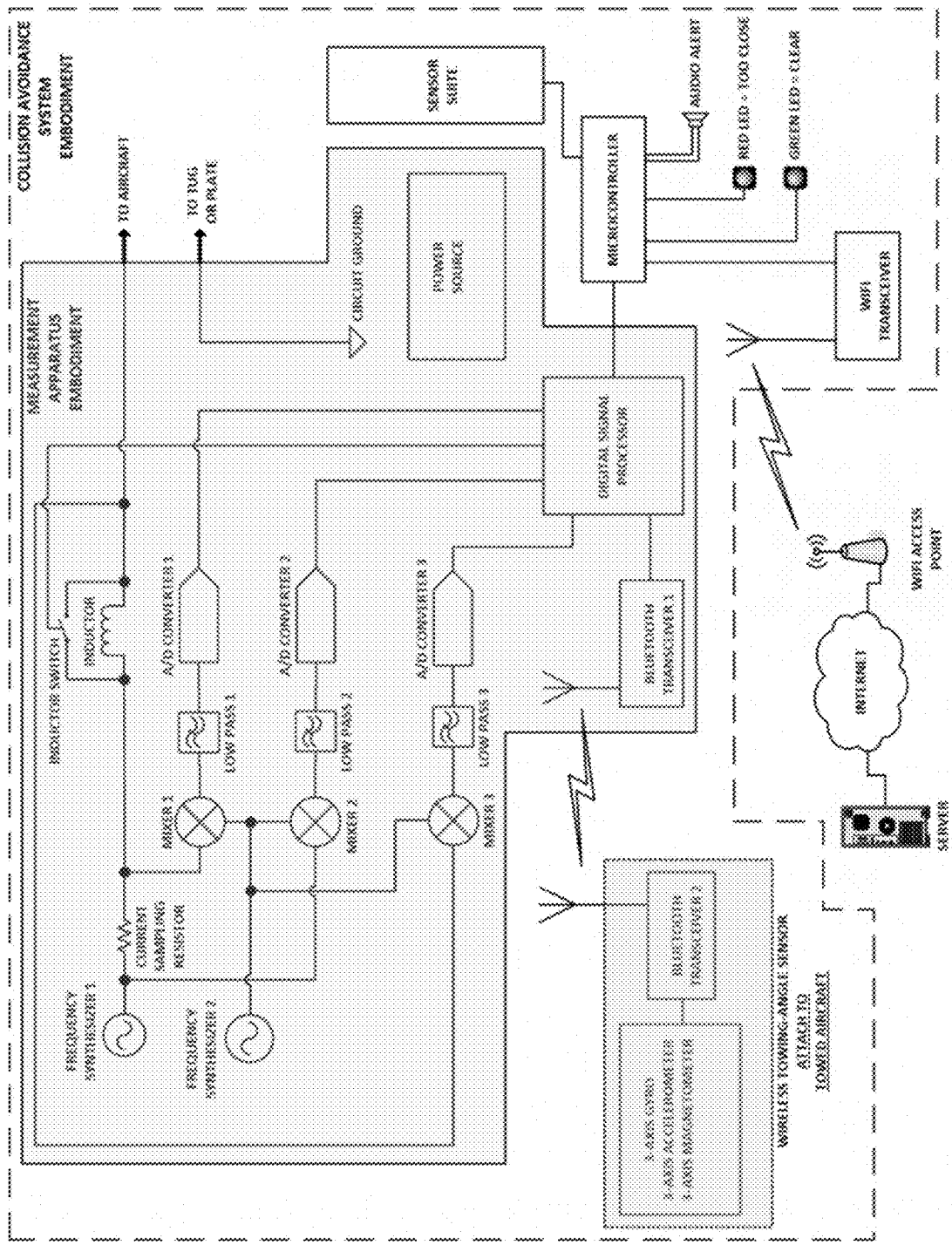
FIG. 16 is an electrical block diagram of a system consisting of a vector impedance measurement apparatus including sensor suite, microcontroller, WiFi link to a wireless access point or router with Internet linkage to a cloud-based server.

In an embodiment of the invention, Towing Angle 1501 is measured by means of a digital or analog encoder affixed between a non-rotating part of the aircraft, such as the upper half of a scissor-link or torque-link knee with the steering pin removed, as shown in FIG. 15, and a steerable or rotatable part of the nosewheel assembly, including that section of the nosewheel strut which is affixed to the nose wheel. The Towing Angle 1501 can be continuously measured during a towing evolution, time-stamped and logged in local memory of the microcontroller shown in FIG. 16 and transmitted via WiFi and the Internet to a cloud server, as are other sensor parameters, so that when combined with other sensor data such as tug-movement direction and speed, a full and complete record of the evolution can be stored locally or in a server and replayed graphically at a later date. An embodiment of the invention could also use measured changes in Towing Angle (DT to compensate for, null out or cancel any undesired effects on equipment accuracy or performance as may be caused by changes in Cm that are related or proportional to changes in Towing Angle (DT.

Figure 17B:
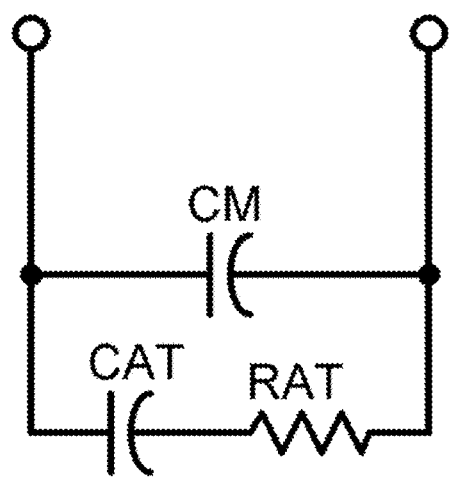
FIG. 17B is a simplified two-terminal electrical schematic diagram model of the three-terminal diagram in FIG. 17A.
Figure 18A:
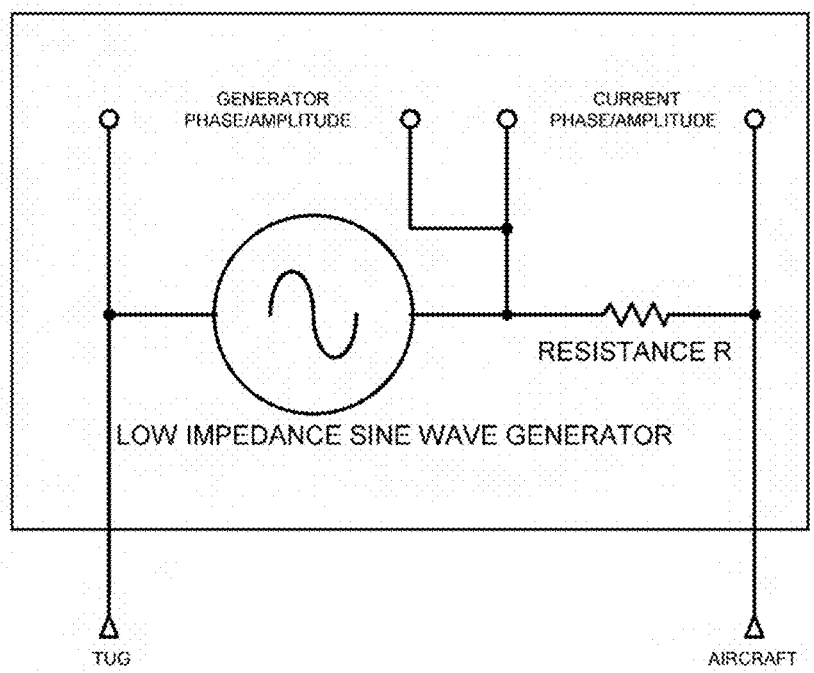
FIG. 18A is an electrical block diagram of a vector impedance measurement apparatus.

The Tug/Aircraft/Earth electrical schematic model shown in FIG. 17A can be simplified to a two-terminal, black-box equivalent circuit at a given frequency as shown in Simplified Model FIG. 17B. In an embodiment of the invention, a low-impedance alternating-current (AC) or radio-frequency (RF) voltage source in series with a known resistance or impedance as shown in FIG. 18A is applied across the two-terminal tug-aircraft system, one terminal being the aircraft and the other being the tug or a plate or series of plates affixed to the underside of the tug. An increase in aircraft capacitance will occur as the aircraft under tow nears a structure or object that is either conductive or that has a permittivity substantially different than that of air (8.85× 10−12 farads per meter), in proportion to the distance between the aircraft and the object or structure. That increase in aircraft capacitance will cause phase and amplitude changes between the voltage generated by the low-impedance source and the voltage across the two-terminal aircraft/tug system. These changes, particularly changes in phase, will be proportional to the separation distance between the aircraft under tow and any objects, such as other aircraft, or structures, such as hangar walls or support beams.

Figure 18B:
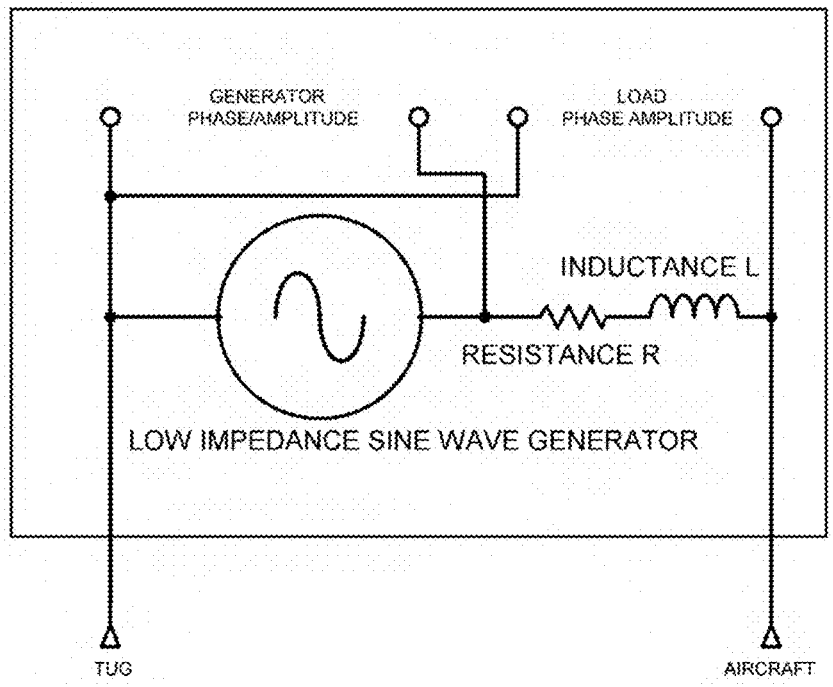
FIG. 18B is an electrical block diagram of a vector impedance measurement apparatus with compensating series inductor.
Figure 18C:
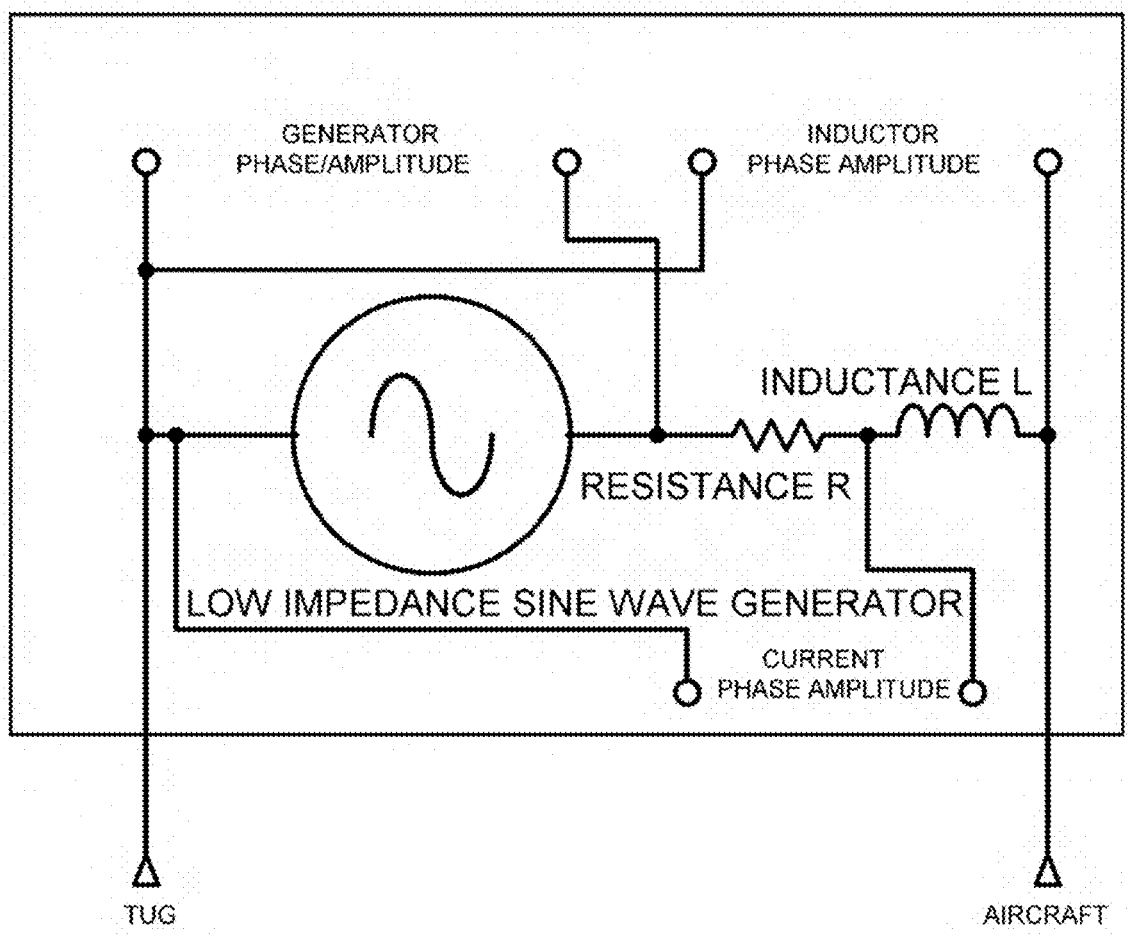
FIG. 18C is an electrical block diagram of a vector impedance measurement apparatus with compensating series inductor and dual measurement attach points.

In an embodiment of the invention, an inductor is placed in series with the aircraft/tug system as shown in FIGS. 18B and 18C, so that at a specific frequency, the capacitive reactances are equal to the inductive reactance of the inductor, leaving only the series resistance of ground RAT. At this point, there will be zero phase shift between the voltage across the low-impedance generator and the voltage across the tug-aircraft system; only voltage division will occur according to the voltage-division rule with the output impedance of the generator and the ground resistance RAT of the tug-aircraft system. This zero-phase-shift point or zero-reactance point is a resonance, and it has a Q that is determined by the reactance of the net capacitance or inductance, which are equal but have opposite signs at resonance, divided by the total resistance, that is, the sum of the generator impedance and the ground resistance.

Should the aircraft capacitance change, CAT will change, and as CAT changes, relative phase shift will then occur between the voltage output from the low-impedance generator and the tug-aircraft system as load, but that phase change will be much more pronounced owing to the presence of the series inductor. Phase change in that instance will be a function of circuit Q. To determine aircraft distance from surroundings, relative phase change can be measured, or the frequency of operation can be adjusted so that zero phase shift is measured between the output of the low-impedance generator and the voltage across the aircraft-tug system. In this latter instance, the frequency change required to maintain zero phase shift will be proportional to distance from the aircraft under tow to a nearby object or structure.

The mutual capacitance CM between tug and aircraft will vary according to the Towing Angle 1501. This variable can be compensated for electronically or by numerical or digital means, thus minimizing or eliminating its effect so that variations in CAT, aircraft capacitance can be measured independent of CM variations.

Such adjustment can be made automatically in a stable feedback loop so that frequency changes automatically to keep relative phase shift at zero degrees. In this way, changes in frequency are proportional to changes in aircraft capacitance, and since aircraft capacitance is proportional to aircraft-to-object or aircraft-to-structure distance, a decrease in frequency will be occur when the aircraft approaches an object or structure. Frequency can be counted using a precision clock so that minute shifts in aircraft capacitance can be detected, and collisions between the aircraft under tow and other aircraft or structures can be readily prevented.

Figure 19:
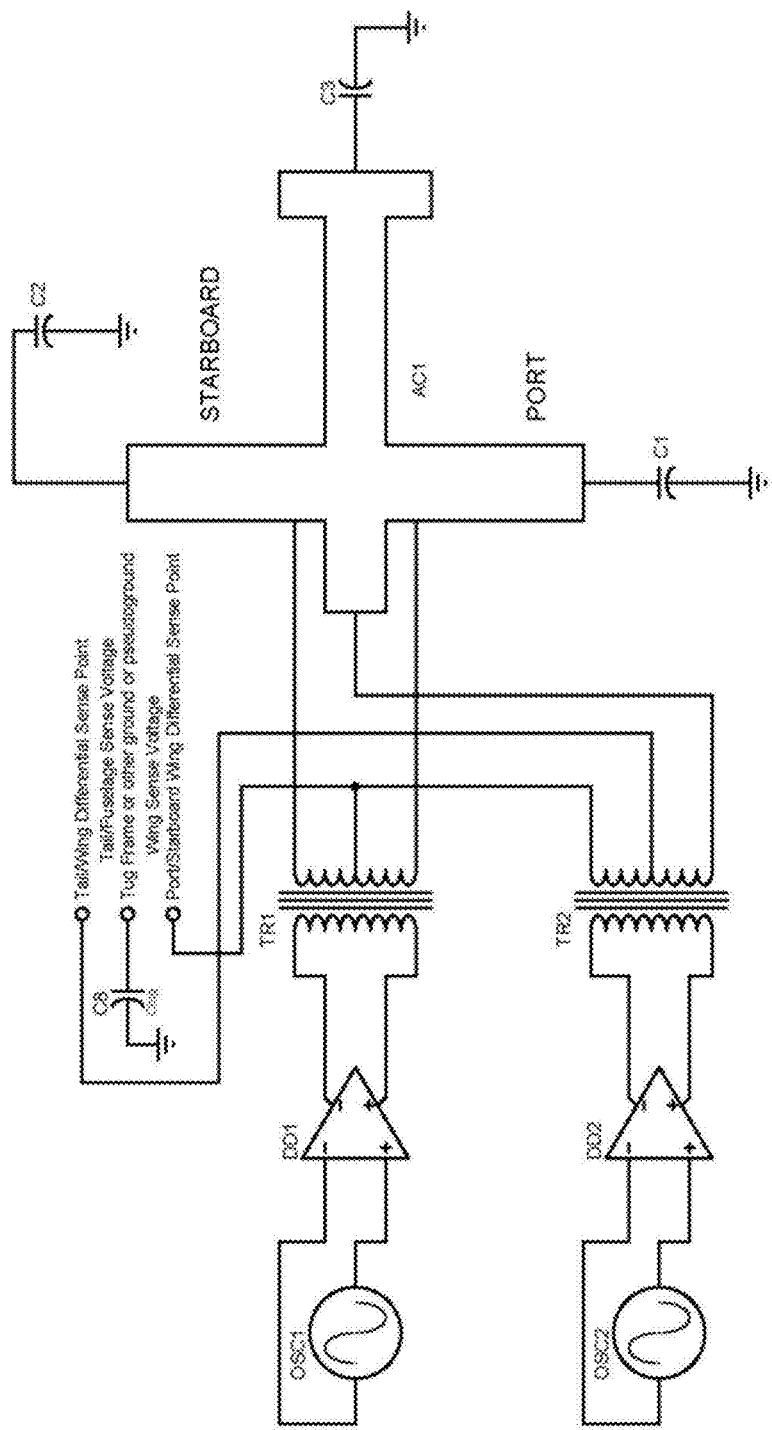
FIG. 19 is a simplified electrical schematic diagram of a dual-mode, balanced differential impedance measurement apparatus employing two center-tapped transformers.

Embodiments of the invention make use of differential drive circuitry, as shown in FIG. 19, to impose a balanced, differential drive voltage between the wings or between the nose and tail section. In one embodiment, a first signal generator or RF/radio frequency source with differential drive capability excites a differential RF voltage between the port and starboard wingtips by coupling RF energy into the wing from a signal-drive point near the fuselage, such as between the left and right main landing gear or nearby attach points. The first source operating frequency at which the greatest sensitivity to the proximity of nearby objects to the wingtips may occur when the physical length from wingtip to wingtip, including additional electrical length due to wing sweep if swept and winglets if included, corresponds to ½ wavelength or odd multiples thereof, such as 3/2 wavelength, 5/2 wavelength and so on. Operating this embodiment of the invention at this frequency or using a waveform such as a square wave that includes odd harmonics may produce the greatest sensitivity to proximate objects, though doing so is not essential to this embodiment.

Parasitic capacitances C1 and C2 in FIG. 19 represent natural airframe-to-ground capacitances of each wingtip. These are normally balanced owing to the left-right physical symmetry of an aircraft, forming a balanced bridge configuration between the center tap of the wing-driver transformer, which is electrically connected to a central point such as the nose gear, and the ground surface surrounding the aircraft. When an object, structure or person nears one wingtip, an increase in the capacitance with respect to ground occurs at that wingtip while the capacitance to ground of the opposite wingtip remains unchanged, resulting in an electrical imbalance of the bridge and an RF voltage with frequency corresponding to the frequency or frequencies of the first excitation between the aircraft fuselage and ground. By sensing the phase of this voltage, annotated as Wing Sense Voltage in FIG. 19, relative to the phase of the excitation, it is possible to determine which wing is nearer to the external object, person or structure and, based on that determination, to indicate a directional warning with a lighted arrow, a change in sound or another characteristic of a warning. The magnitude of the Wing Sense Voltage will be proportional to the proximity of the external object, structure or person.

A second signal generator or radio frequency source that is transformer coupled to the center tap of the wing-driver transformer and the nose wheel or a similar attach point along the center of the aircraft fuselage is capable, in like manner, of coupling a differential RF voltage or excitation between the tail section of the aircraft and the nose or forward section of the aircraft, which may or may not include the wing. This second RF source may be at a different frequency as the wing-driver source or may be at the same frequency. It may be time, phase or frequency multiplexed with the wing-driver source, so that wing-proximity sensing and tail-nose proximity sensing to not interfere with one another, as the second signal generator's signal may be orthogonal in frequency or phase to the wing-driver source. In this configuration, the tail section may act as a ¼-wave monopole driven with respect to ground elements consisting of the nose, and the entire wing, including both left and right sections. Ordinarily, the voltage between ground and the center tap of the nose-driver transformer is electrically balanced and zero. When the tail section approaches an external object, person or structure, an imbalance is created, resulting in a voltage between the center tap of the nose-driver transformer and ground.

Figure 20:
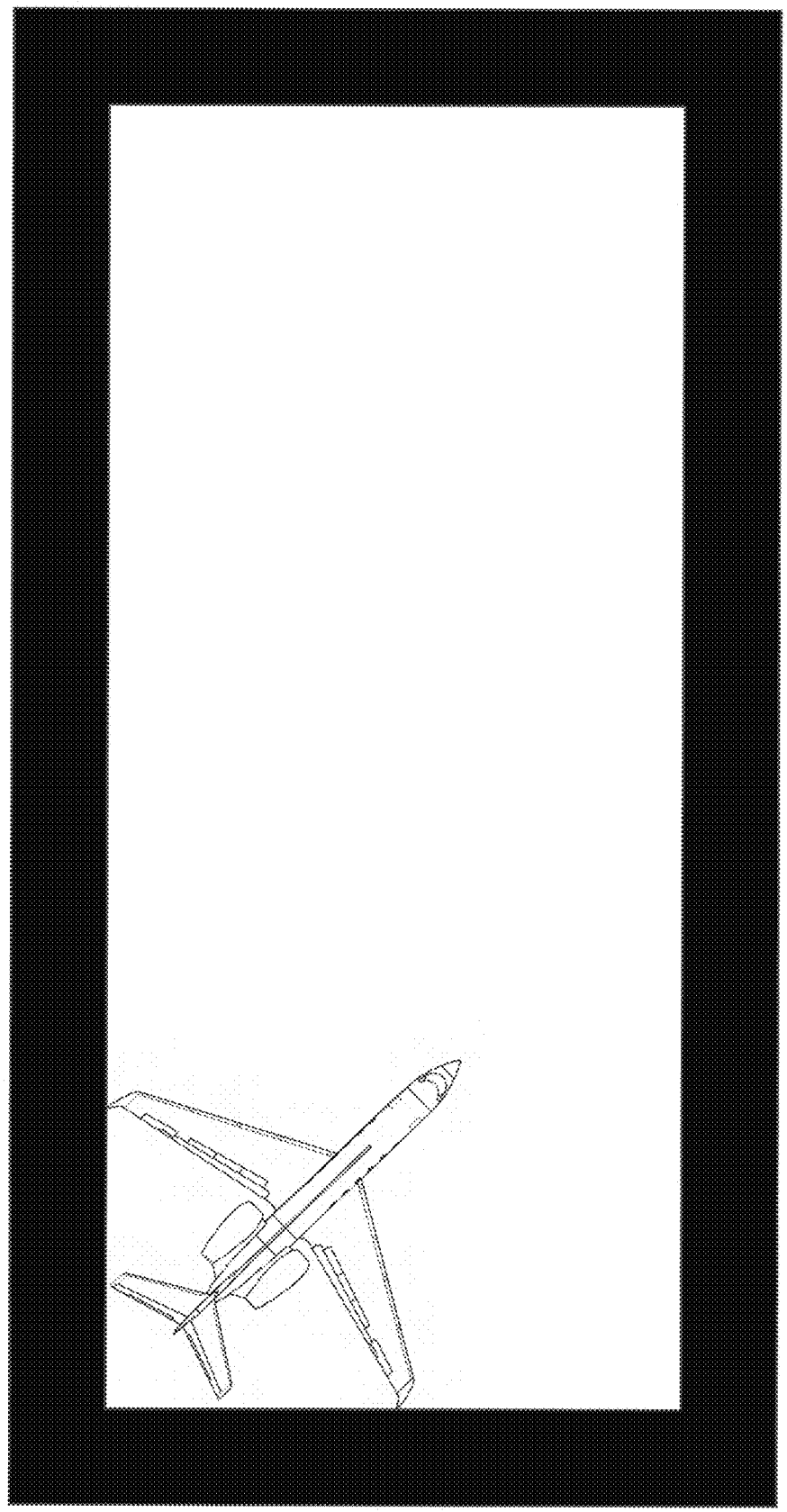
FIG. 20 is a plan view drawing of a typical twin-engine jet aircraft located in the corner of a hangar or similar structure wherein the wingtips and tail section are all approximately equidistant from the walls of the structure.

Similarly, if either or both wingtips approach an object, person or structure and an imbalance is created, but simultaneously, an imbalance will occur in the differential wing-proximity-sensing circuitry. The phase of the imbalance or error signal will reveal whether the proximate object is near the wing or near the tail. If the error signal of the tail/wing proximity warning circuitry indicates that the proximate object is near the wing, but there is no proximity warning from the left/right wing sensors, this indicates that both wings, most likely the wingtips, are approaching a fixed object at approximately the same rate and distance. This might occur as an aircraft is pushed into the corner of a large hangar, as illustrated in FIG. 20. Should all three extremities of an aircraft under tow simultaneously approach a fixed structure as shown in FIG. 20, coupling an in-phase signal to the wingtips and tail section with respect to a neutral point such as where the wing root meets the fuselage might be employed in combination with sensing an increase in signal coupling between the airframe and earth ground to generate an on/off or proportional alert in this particular geometric arrangement of aircraft and surroundings.

Using information derived from the whole-wing/tail-section error signal and the differential wingtip error signal, it can be determined when both wingtips are approaching an external object or structure at similar rates of closure, which may not be detectable from the wingtip-differential sensing circuitry alone. This same deductive determination, whether wingtip or tail section, might be made by employing the tail-sense circuitry alone or in combination with the wing-sense circuitry, all in combination with one or more of the alternative embodiments disclosed elsewhere in this specification. In this way, all instances of aircraft proximity to nearby objects are sensed, even simultaneous proximity at all three extremities as illustrated in FIG. 20. The connect points of drive signals, neutral point and sense points may be time multiplexed rapidly to provide confirming or additional information. The error signals generated from these multiple arrangements may then be processed using digital signal processing algorithms such as maximum-likelihood estimation and other Bayesian inferences, best fit to previously recorded or known curves and other complex mathematical or probabilistic methods to better predict collision or proximity and to minimize or avoid false-positive triggering.

Figure 21:
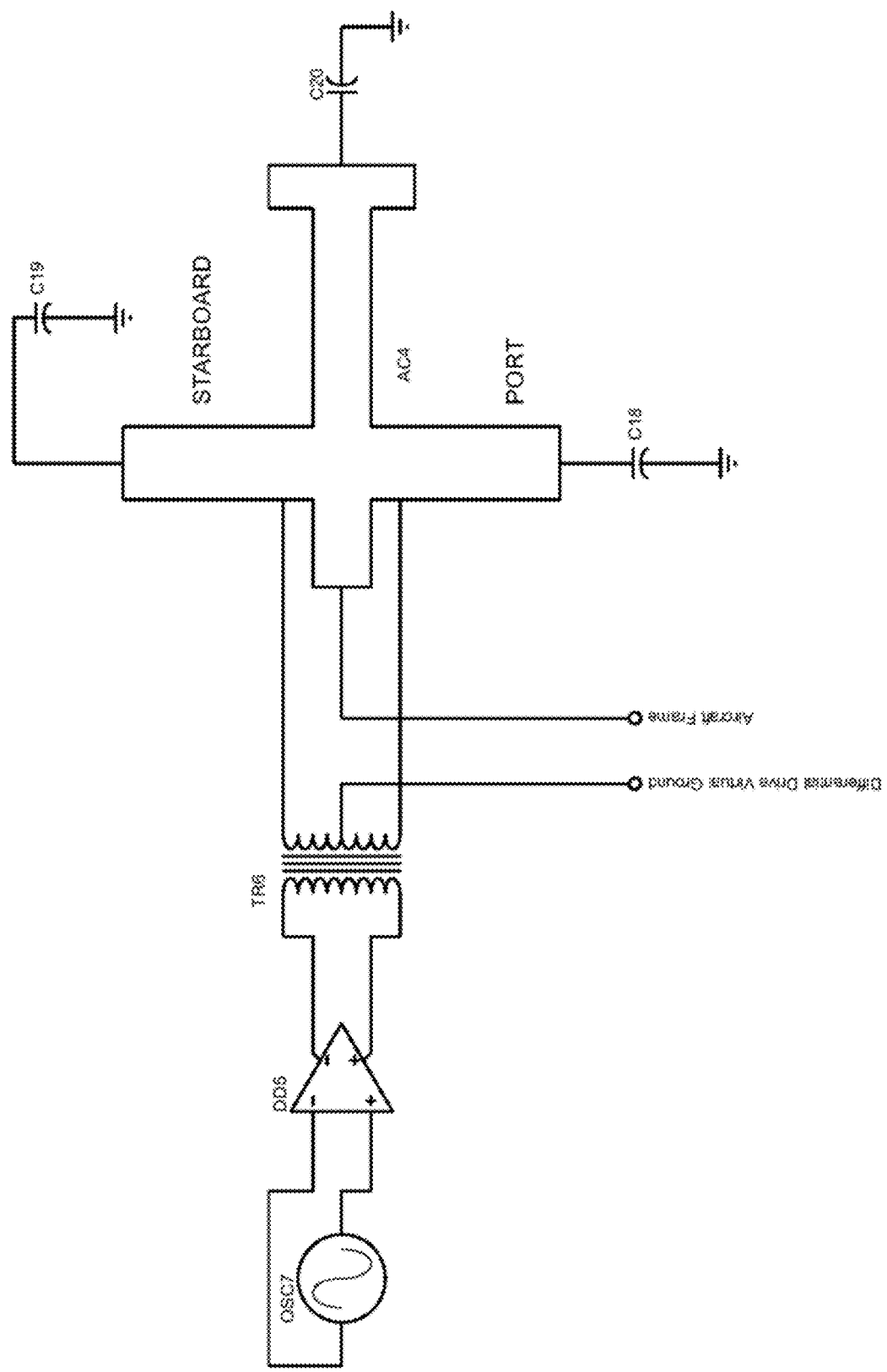
FIG. 21 is a simplified electrical schematic diagram of a single-mode, balanced differential impedance measurement apparatus employing one center-tapped transformer.

A single differential drive embodiment of the invention is illustrated in FIG. 21. Such an embodiment could be designed into a new aircraft or retrofitted internally without extensive external modifications. Sensing a differential-drive imbalance between the center tap or neutral point of a differential wing driver and the fuselage itself provides a signal whose magnitude is proportional to wingtip proximity, the phase of which, relative to the excitation, indicates which wing is near an object, person or structure. The differential drive points could be attached internally to port and starboard wingtips using existing wingtip navigation or anti-collision light wiring or separate parallel wiring.

Figure 22:
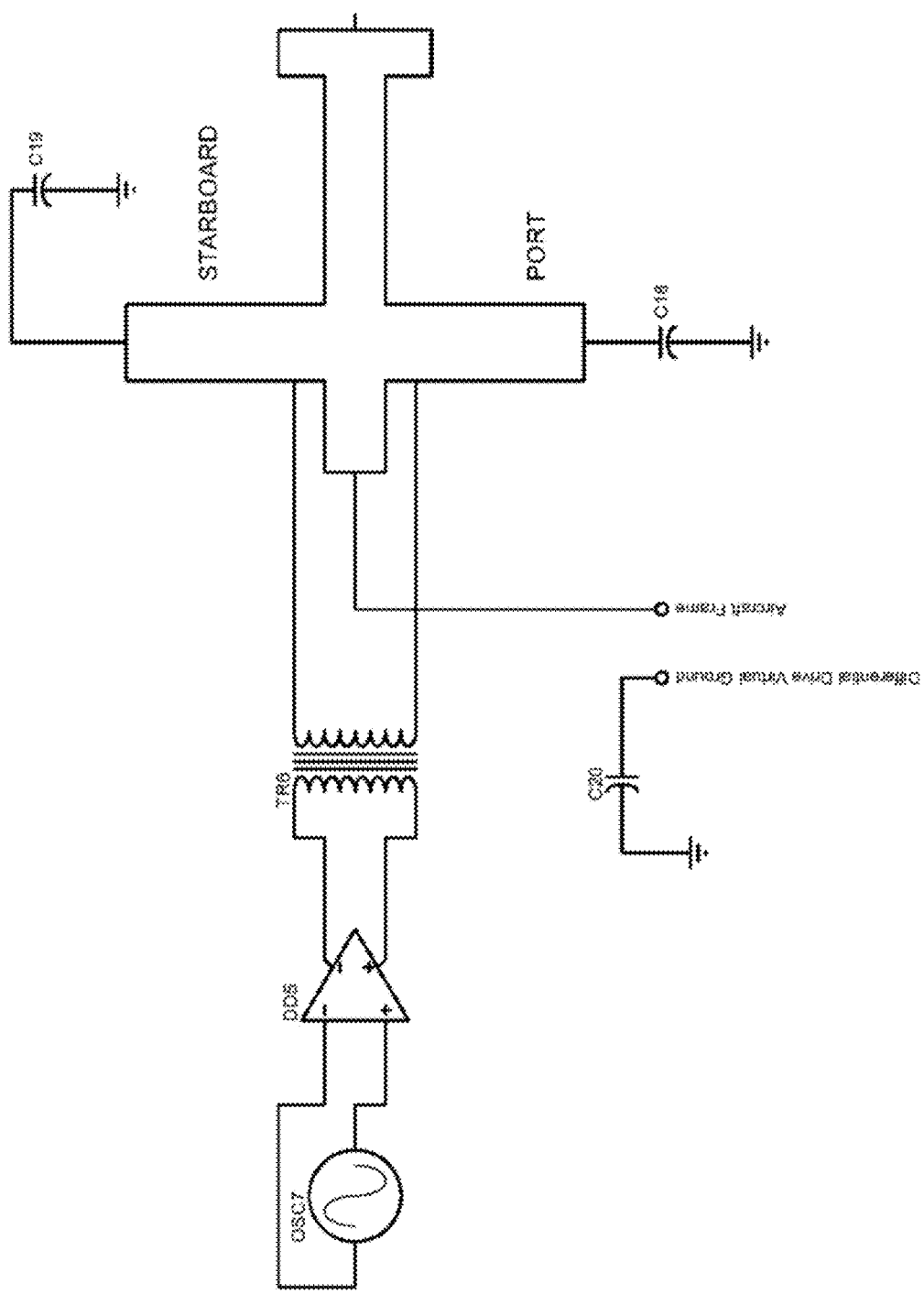
FIG. 22 is a simplified electrical schematic diagram of a single-mode, balanced differential impedance measurement apparatus not employing a center-tapped transformer.

Similarly, a single-differential-drive embodiment could be implemented by a generator with no center tap as shown in FIG. 22. In this embodiment, the drive signal is applied to any two points between the wingtips or between the main landing gear. The proximity or imbalance error signal is then sensed between any point on the aircraft center line and earth ground, which may be contacted directly or via any effective capacitive coupling, such as the bottom side of an electrically isolated tug or an antenna or insulated plate on the aircraft's underbelly.

Any of these differential arrangements and center-tap or neutral attach points may be used in any combination, including embodiments wherein differential drive is applied between any two attach points on an airframe, such as the nose and one wing, the tail and one wing, the nose and the tail, the left and right portions of the horizontal stabilizer, the horizontal stabilizer as a whole and the vertical stabilizer and rudder and so on. Coupling between the signal generating drive circuitry and any of these differential arrangements may be electrical, magnetic, capacitive or any combination of these as is suitable to implementation as externally attached equipment connected only during towing evolutions, incorporation into a tug or other ground-support equipment or inclusion in an aircraft or other vehicle, either at time of manufacture or as aftermarket retrofitted equipment.

Figure 26:
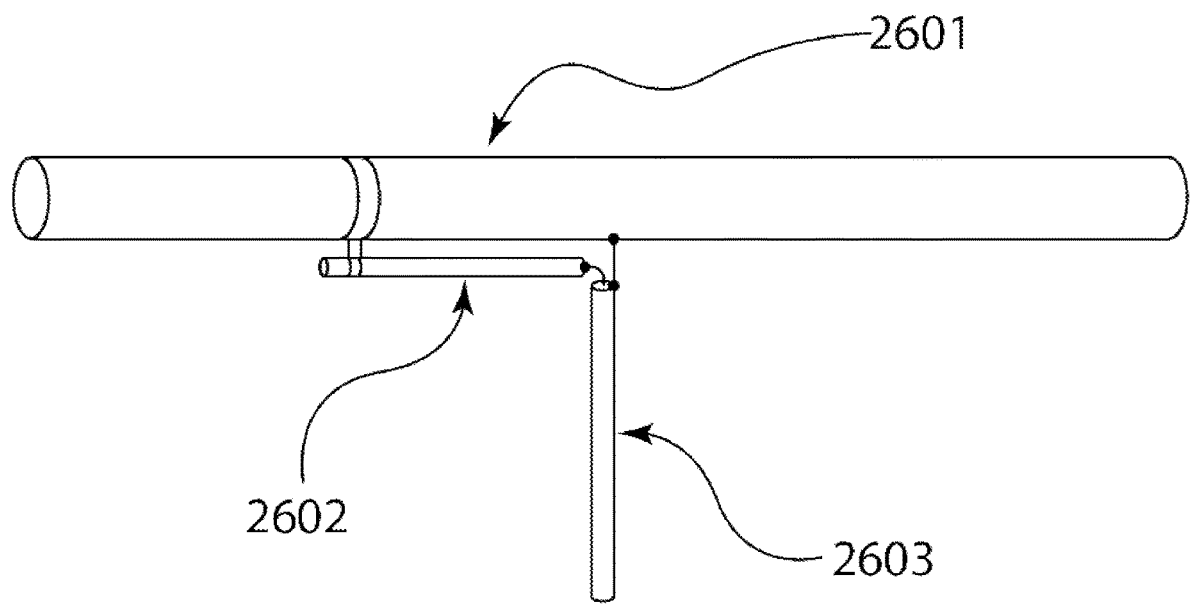
FIG. 26 is an illustration of a dipole antenna element with a "gamma match" balun and impedance match element.

Any means of introducing a differential voltage between one wingtip and its opposite, between the tail section and nose, between the left and right halves of the horizontal stabilizer, between the vertical stabilizer and the horizontal stabilizer or any two extremities of any moving object may be employed, including but not limited to direct electrical connection, electromagnetic coupling from a tug-mounted antenna, capacitive coupling or inductive coupling may be employed. It should also be noted that a differential voltage may be induced into a conductor, such as a wing, by driving only one wing with respect to a point on the fuselage centerline such as the nose gear, as is done with the "gamma match" employed widely in antenna design and illustrated in FIG. 26 showing dipole element 2601, unbalance coaxial feed line 2603 and feed stub 2602. This arrangement creates an RF balun, or balanced to unbalanced transformer or converter that behaves in like manner to a transformer.

The invention is not limited to being employed or incorporated into the conventional airfoil and control-surface arrangements of fixed-wing aircraft as illustrated in FIGS. 1A, 1B, 1C, 9, 10A 10B, 10C, 10D, 12, 14 and 15 but may also be deployed to protect any surface of any aircraft, such as the main and tail rotors of a helicopter, the canards or forward lifting surfaces such as those found on the Beechcraft 2000A Starship, or of any vehicle such as an automobile, a semi-tractor trailer, bus or hovercraft.

Figure 23:
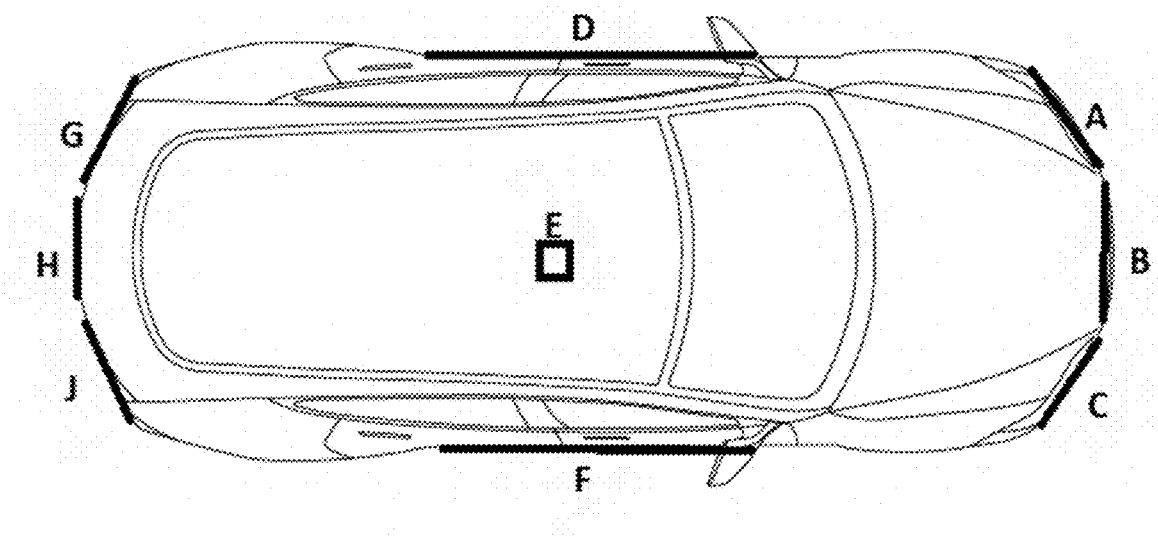
FIG. 23 is an overhead view of an automobile showing one central electrical connection and 8 independent differentially driven connections.

Any embodiment of the invention may be incorporated into other vehicles and objects with the intention of preventing collisions or any inadvertent contact. A differential-drive embodiment might be included in an automobile, for example, as shown in FIG. 23. In this embodiment, as in others, the two differential-drive signal attach points and the differential-drive neutral point may be switched or time multiplexed so that a single arrangement of center-tapped or neutral-equipped differential driver with complementary sense circuitry may be switched to perform multiple, independent proximity tests in rapid succession. For example, a differential-drive signal might be applied between points A and C in FIG. 23 while the driver's neutral point is attached to point B. in this arrangement, as the vehicle's left front bumper approached a concrete support in a parking lot, for instance, an imbalance could be sensed between point B and the vehicle's chassis, which is represented in FIG. 23 by central attach point E, a floating ground that capacitively couples to earth ground.

An embodiment of the invention may be responsive to motion of an entire vehicle or to motion of any part thereof. For example, coupling differentially between points D and F while sensing between the differential-drive neutral point and the chassis-coupling point E of FIG. 23 could sense when a car door is being opened in a parking lot. This embodiment could produce an audible warning, or the warning and alerting circuitry could be directly coupled to the car's door-opening linkage so that any further opening of the door that might cause direct contact with another vehicle or concrete support beam might be directly halted by any of a solenoid, motorized brake, hydraulic valve or pump that are capable of being operated electrically. In this way, nicks in paint and dents in metal, which are the automotive equivalent of hangar rash as commonly occurs in public parking lots and garages, might be minimized or prevented. Alternatively, actuation of a door handle or the press of a button could, under motorized control, automatically open a car door or trunk only as far as said door or trunk could be opened without collision. Similarly, this embodiment of the invention could warn by means of audible alerts and visual indicators as soon as the vehicle is put in park, that one or more doors, a hatch or a trunk has insufficient space for opening and human egress or access. Similar arrangements could be used in an automotive alarm system, sensing proximity of other vehicles or persons, general area of approach and providing an externally audible alert such as sounding a horn or flashing of a light prior to contact. Said warning system could sense and trigger alarms when a parked vehicle is touched or approached, preventing or discouraging such activities such as keying, physically scratching or other deliberate vandalism or undeliberate actions.

Just as in aviation-related embodiments of the invention wherein entire sections such as the wing are employed as radiating or resonant elements, any vehicle such as a car or bus will have a natural front-to-back resonant frequency when driven as a dipole element in the front-back orientation, and a different, generally higher side-to-side resonant frequency when driven as a dipole element from side-to-side. In this way, a vehicle need not be equipped with dedicated electrodes, plates or other electrically isolated contacts for differential-drive embodiments of the invention to function.

Figure 24:
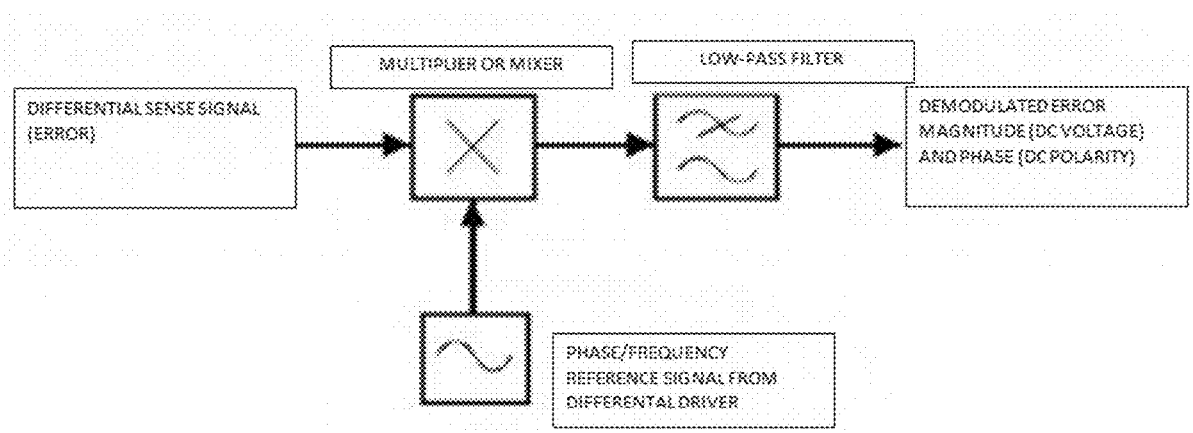
FIG. 24 is an electrical block diagram of a synchronous demodulator that provides a DC or low-frequency signal representing the relative phase and magnitude of an error signal.

Error signal detection is typically done by means of synchronous detection of the differential drive signal, and such detection may be implemented in analog or digital circuitry as illustrated in FIG. 24 or by equivalent digital sampling processes, A/D conversion and software defined radio (SDR) techniques. This synchronous-detection circuitry or equivalent signal processing algorithms, in addition to performing rectification, synchronous detection, absolute value calculation and low-pass filtering or integration, may also perform noise filtering, noise blanking, automatic scaling or time-averaging of the error signal, as these may diminish the effects of external radio noise and interference. Sensing when the post-processed error signal has exceeded one or more preset or adaptively established threshold values will determine when the alerting circuitry will be triggered and at what level.

These differential-drive and sense embodiments, coupled with alerting circuitry capable of generating or activating any or all of audible, visual, graphical, numeric, tactile or haptic alerts directly and proportionately or in response to the error signal crossing one or more thresholds completes the differential-drive embodiment.

An embodiment of the invention employs Time Domain Reflectometer or TDR techniques, wherein the aircraft body is treated as an unbalanced transmission line above the ground plane comprising earth ground and any surrounding or nearby structures, such as but not limited to a hangar or aircraft storage unit. In this mode, a narrow pulse, group of narrow pulses or a pulse-modulated RF burst are generated by an embodiment of the invention. The pulse, group of pulses or pulse-modulated RF burst propagate along the exterior of the aircraft body acting as an unbalanced transmission line above the ground plane of earth ground at a propagation velocity less than c, the speed of light in a vacuum, until they reach extremities such as wingtips, horizontal stabilizer and vertical stabilizer where they are reflected by these electrically open ends of the aircraft body as transmission line. By observing minute changes in the time of arrival of the reflected signal corresponding to each transmitted signal and observing its magnitude, phase, spectral characteristics in the frequency domain or waveform in the time domain, inferences can be made about the separation distance between parts of the aircraft and nearby objects or structures.

Similar to time domain reflectometry or TDR techniques, direct sequence spread spectrum time domain reflectometry (DSSTDR) depends for its operation on the transmission of pseudorandom bit patterns, or pseudorandom bit patterns modulating an RF carrier. The transmitted signal propagates from the electrical attach point near the nosewheel along the fuselage and out to the extremities. The delayed time of arrival and other characteristics of reflected signals bouncing off of an aircraft's extremities or other discontinuities caused by objects or structures as may be near the aircraft's body are compared, as in TDR, with the original transmitted signals, and inferences are then made about the position and proximity to the aircraft of nearby objects or structures. By examining changes in the timing and other characteristics, inferences can be made regarding relative motion between the aircraft and nearby objects and structures, and an alarm sounded when necessary.

Figure 25:
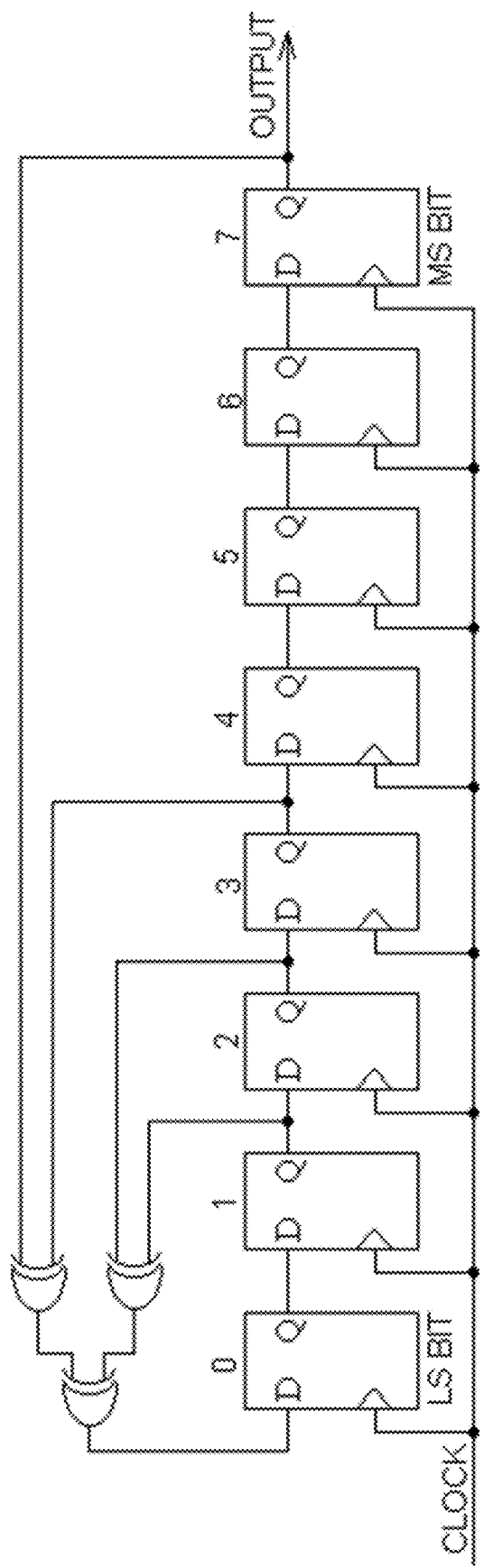
FIG. 25 is an electrical schematic diagram of an 8-stage, linear-feedback shift register for generating a pseudorandom sequence of length 255.

The needed patterns may be generated by a maximal-length linear feedback shift register (LFSR), which generates a pseudorandom pattern of length $2^n-1$, where n is the number of shift registers that make up the generator. By way of example, a properly configured LFSR with 8 shift-register stages as shown in FIG. 25 will generate a repeating pattern of length $2^8-1=255$ bits. Pseudorandom bit sequences generated by any other means may be used as well, so long as they have low autocorrelation values.

Using digital recording techniques, it is feasible to transmit bursts of actual additive white gaussian noise (AWGN), comparing each reflected random burst against the digitally stored transmit burst, and as in DSSSTDR, inferences can be made about the aircraft's proximity to nearby objects and structures from the measured time delay between transmitted signals and signals reflected by the aircraft body.

Multi-carrier time domain reflectometry (MCTDR) is similar to DSSTDR except that MCTDR employs multiple independent carriers in a manner similar to orthogonal frequency division multiplexing (OFDM), wherein each equally spaced carrier is individually modulated by an independent pseudorandom bit sequence. As in DSSTDR, reflected signals are compared against transmitted signals and inferences are made about the locations of an aircraft's extremities, of nearby object and structures and warnings are generated accordingly.

An embodiment of the invention includes a sensor suite comprising any of: a one-, two- or three-axis accelerometer; an electronic gyro sensitive to rotation in one, two or three axes; a magnetometer operating in one, two or three axes; a GPS receiver system and antenna, which may or may not include any of WAAS, wide area augmentation service capability for improved accuracy, or A-GPS, GPS augmented by a carrier phase/frequency recovering receiver for greater sensitivity even within hangars; a GPS-disciplined real time clock/calendar that automatically corrects itself whenever a GPS signal is available, but which calibrates itself to GPS and free-runs with sub-second accuracy for several weeks at a time when no GPS signal is available, and automatically adjusts itself, according to geographic location, time and date, for time zone and Daylight Savings Time; one or more rotary encoders or other rotation-sensing means attached to one or more of the wheels on the tug, the aircraft or both so that movement of the tug or tug/aircraft system is sensed; a barometric pressure sensor; an ambient light sensor, including one capable of measuring overall brightness, and UV (ultraviolet) index or both; one or more temperature sensors, including one for measuring the temperature of the apparatus and another for measuring ambient temperature; a relative humidity sensor; a microphone or acoustic sensor configured specifically for sensing impulsive or percussive noise, but including signal processing elements that preclude monitoring or recording human speech.

With these sensor elements, correlations can be made between one measurement and another so that, for example, an abrupt increase in aircraft capacitance, as would occur if the aircraft being towed had actually collided with another aircraft, for example, that abrupt capacitance increase could be correlated with an abrupt acceleration in one or more directions sensed by an accelerometer. That acceleration might be correlated with an acoustic impulse sensed by an acoustic sensor or microphone. By means of redundant detection, the probability of detection of a collision event is increased, and the likelihood of a false-positive indication is likewise diminished. Furthermore, timing between the capacitance change, which is electrical in nature and travels at c, the speed of light, the acceleration impulse, which travels at Vm, the speed of sound in metal or composite depending on the airframe makeup and lastly, the acoustic impulse Va, traveling at the speed of sound in air could help to pinpoint the location of the collision relative to the apparatus, so that it might be quickly isolated to a wingtip, the tail, part of the fuselage or some inboard location along a wing. Such information can be logged, uploaded to a server and, according to settings, might immediately notify a hangar manager, flight-crew member or aircraft owner via email or text message if the composite pattern of simultaneous inputs from multiple sensors matched or closely fit the known signature of a collision.

An embodiment of the invention may include voltage- and current-measurement capabilities to determine the voltage and current flow of any battery internal to the invention, external to the invention or within the tug or tow vehicle and thereby calculate charge state of any or all of these batteries.

An embodiment of the invention includes a processor or microcontroller to perform calculations, trigger alerts, to manage memory for its own use and for storing essential data, including time-stamped towing-evolution data.

An embodiment of the invention may include at least one video camera, including HD, 4K and 8K types, to monitor and record aircraft movement evolutions or at least one still camera that records periodically, when triggered, or upon occurrence of certain events or may include both video and still cameras. These still images may be stored in local memory or may be uploaded to the cloud.

An embodiment of the invention may include a Towing Angle sensor or encoder that measures the angle between the tug and the aircraft as illustrated in FIG. 15. The Towing Angle sensor or encoder may be separately enclosed and linked to the primary apparatus via wired or wireless means. For example, an attachable unit comprising a single TDK InvenSense MPU-6500 3-axis accelerometer/gyro integrated circuit (IC) coupled to a Bluetooth transceiver module such as the Silicon Labs BGM111A256V2R powered by lithium coin cell, attached to the aircraft at any point and electronically initialized or mechanically oriented so that initial towing angle is entered or zeroed would provide the necessary data simply, reliable and without wires.

High-impedance methods, such as the current-source-based circuit illustrated in FIG. 5 for measuring aircraft capacitance may be more susceptible to ambient signals and noise and environmental effects than lower-impedance alternatives. For example, an aircraft may have just landed on a snowy or slushy runway that has been treated with salt, magnesium chloride, calcium chloride, similar chemicals or a mix of these. When brought into the hangar by a tug, the aircraft's tires may still be coated with an aqueous solution of any of these substances, dissociated into ions and therefore somewhat conductive. The tires from the tug may be similarly coated, and thus both of these may have substantially increased conductivity (resistance=10,000 ohms or so) to ground when compared with the relatively low conductivity of dry tires (resistance=200 Megohms or so). Increased conductivity or lowered resistance to the flow of electric currents may limit the ability of a high-impedance, low-current system to function properly, because currents, which are used to measure capacitance, may flow between the tug and aircraft through these extraneous pathways, producing erroneous results. Low-impedance circuits employing higher-frequency AC circuits will not be affected by these extraneous flows. Increased tire conductivity is likely to have greater effect when tug and aircraft are moving across blemished surfaces, such as a painted concrete floor that's chipped.

There may be electrical high noise levels in and around hangars, with fluorescent, mercury vapor, sodium vapor lights powered via ballasts or high-intensity LED lighting driven by switch-mode power supplies. Radio-based navigational aids are typically located nearby, such as VOR, TACAN, DME, ILS, LOC, NDB and marker beacons. There are broadcast stations transmitting high-power AM signals, FM signals and digital video. Inside and near the hangar, there are walkie-talkies, cellular phones and VHF and UHF aviation communications transmitters. The aircraft body will function as an antenna to pick up these fields produced by these electrical devices and transmitters, adding with the electrical stimuli that are applied to the aircraft body by certain embodiments of the invention. Generally, the lower the impedance of those embodiments, the less will be the influence of these external fields on the readings and performance of those embodiments. Thus, low-impedance embodiments with narrower measurement bandwidths are likely to produce superior results.

In an embodiment of the invention, data from one or more sensors is logged in local flash memory and may be time-stamped by the internal clock-calendar. The apparatus may include a keypad for PIN code entry, biometric sensors or other identifying means so that prior to activation of the tug, the identity of the tug operator is first verified. By means of an RFID placed on each aircraft, an optical barcode identifier that must be scanned by a laser or camera or other unique identifying means, the aircraft being repositioned can or must, depending on software or hardware logic, first be identified prior to movement.

Sensor data recorded locally, including towing angle, allows any towing evolution to be replayed, so that aircraft and tug movements can be retraced on a plan view map of the hangar and ramp area. In this way, any unusual or unauthorized movement of aircraft is readily traceable, and the location at which any mishap occurred can be identified.

In an embodiment of the invention the aircraft-monitoring apparatus is equipped with Internet of Things (IoT) wireless telecommunications capability that may include local or carrier-based WiFi, carrier-based LTE, LTE-A, 5G, GSM or other standards, Bluetooth or any other digital wireless communications method. The apparatus as network client can initiate communications with a remote cloud server without resorting to port forwards or other special router configurations. By periodic, scheduled check-ins, the real-time status of the apparatus and the charge state of its batteries can be continuously monitored, as can the presence, status and charge state of the batteries of the tug to which it is attached or into which it is integrated.

The cloud server can also upload and store an additional copy of any or all data logged within the apparatus, and this can be done in bursts on a regular basis, so that the data is recoverable, even if the local apparatus should become damaged or lost. The server can be equipped with additional server applications such as a mail server. In this way, the server can send out timely scripted emails, or via a text-message gateway, text or sms (short message service) messages to inform a hanger operator, FBO, flight crew or aircraft owner of any unusual activity, or of the occurrence of any events that might be preset into the server via a customer GUI or graphical user interface, such as a web page generated by an internal web server. Any number of separate administrator access levels may be established, each having individual authentication, defined levels of access to information and editing authority, the ability to add, change or delete usernames and passwords in a hierarchical manner.

Embodiments of the invention that include wireless or IoT capabilities typically reside on the private-network side of a router that includes network address translation (NAT) and as such may compromise the network security of other devices attached to that same network. Consequently, networked embodiments may also include extensive encryption capabilities including but not limited to AES (Advanced Encryption Standard) Triple DES (data encryption standard) and SSL (secure socket layer) for client-server communications. Furthermore, all client-server communications are client initiated so that external (Internet) probing of the private subnetwork via the IoT capabilities of networked embodiments of the invention is very challenging and so that there is no need for port-forwards or other custom routings that diminish network security and typically require intervention and configuration of the local router by IT (information technology) support professionals.

These same or similar encryption technologies may be used for administrative access to any associated servers, so that web GUI (graphical user interface) as well as CLI (command line interface) ports are protected and secure. The web GUI may utilize http (hypertext transfer protocol), https (hypertext transfer protocol—secure) or similar protocols. The CLI may utilize ssh (secure shell), telnet or similar protocols.

The server may include several independent elements, including a mail server, GUI and text-interface servers, a database built with SQL (structured query language) or a similar data manipulation and modification method, an API or application programmer interface so that server-inclusive embodiments of the invention are easily linked to third-party software such as hangar-management applications.

FIG. 16 illustrates an embodiment of the full system, including sensors and a remote server. The Measurement Apparatus Embodiment includes a first synthesizer that generates sinusoidal signal at a first frequency. This first signal is the excitation, and it is passed through the current-sampling resistor and optionally, under DSP control via an Inductor Switch, through or around an inductor to the aircraft being towed. The connection to the aircraft being towed is typically made via a large alligator clip on the end of a wire from the measurement apparatus. The clip is attached to or near the aircraft's nosewheel strut or to a nearby grounding tab that is intended for fuel-truck grounding. Similarly, the circuit or system ground is connected to the chassis or frame of the tug, or to a grounding plate attached thereto as described elsewhere in this specification.

The utility of certain embodiments of the invention is realized through the warnings that they provide of imminent collisions. Those warnings may take several forms including visual, aural and tactile or haptic stimuli, as might be provided by, respectively, one or more flashing lights, beeps or other sounds and vibrations that shake a tug driver or other operator of the vehicle in motion. An embodiment of the invention includes a graphical display showing a plan view of the aircraft under tow with flashing segments that show which part of the aircraft could be approaching another object or structure.

Greatest value in the aircraft-towing situation is perceived in warnings that are pronounced and conspicuous but are not distracting or overwhelming to the tug operator. For example, a graphical display that indicates by some means precisely that part of an aircraft that is in danger of contacting an object or structure is useful, but if it is the only warning provided, it is a distraction, taking the tug operators eyes off of the aircraft being moved and its surroundings and thereby creating a greater opportunity for incident or accident, including the potential for endangering the tug operator or others involved in the repositioning evolution. In contrast, a click or short tone or beep whose repetition rate, pitch or both increases as the distance between the aircraft being towed and a nearby object or structure decreases requires no diversion of or distraction to the tug operator's vision.

It is important that such clicks, beeps or tones are sufficiently loud that they are certain to be heard, even by a tug operator whose hearing may be impaired or who may be wearing hearing-protection equipment such as ear plugs, ear muffs or headphones, but not so loud as to be objectionable or to cause offensive. Aural warning parameters such as pitch, volume and timbre can be altered to optimize the effectiveness of such warnings, or user-alterable settings included in an embodiment of the invention could make the warnings customizable to suit different situations or environments. Spoken warnings synthesized through text-to-speech conversion or by digitally stored speech could, for example, provide spoken warnings including the number of feet between the aircraft and a nearby object or structure. An embodiment of the invention could include an automatic, adaptive adjustment mechanism that, for example, monitors ambient noise levels in between beeps or, applying adaptive cancellation techniques, during beeps so that as ambient noise level increases or decreases, the amplitude of warning beeps increases or decreases in proportion or in steps. Alternatively, operator headphones equipped with Bluetooth or a similar wireless transceiver or receiver coupled with a Bluetooth transceiver or a similar wireless transmitter integrated within or attached to the invention for the purpose of conveying audible alarms can be included, thereby overcoming most ambient noise problems.

Any embodiments of the invention's collision-sensing circuitry may be linked into either or both of the braking and drive systems of a tug or aircraft so that motion is slowed or halted automatically when imminent collision is sensed. Links between the collision-sensing or warning circuitry and solenoids, motors, hydraulic valves and pumps that are capable of being electrically operated or actuated may be used to slow or cease motion automatically rather than relying upon human operators to do so. In embodiments of the invention, human operators may be eliminated altogether so that aircraft or vehicles are moved or parked automatically or robotically using embodiments of the invention alone or in combination with other technologies.

Embodiments of the invention may employ multiple simultaneous detection by multiple means to assist in the prevention of false positives, that is, sounding alarms when no threat of collision exists. Each mode of sensing shifts in capacitance, impedance, amplitude phase may be combined in analog circuitry, in digital logic or in software or within any combination of these so that fixed or adaptive alert thresholds are established in a way that that minimizes he likelihood of false alerts without compromising the sensitivity or effectiveness of the invention.

Embodiments of the invention have multiple inputs from sensors such as GPS position, gyros whether electronic or mechanical, accelerometers from which velocity can be calculated, magnetometers for sensing orientation relative to the earth's magnetic poles, towing-angle encoders or sensors and tug-wheel rotation sensors or encoders. Using these sensor inputs, the position, vector velocity and vector acceleration of each of the aircraft and tug can be known separately. This sensor input may also be input to the circuits and software that establish collision-alert thresholds so that situations involving proximity to, for example, a structure above the aircraft, but which represent no collision danger because of known clearances can be readily identified and effectively mapped so that these do not trigger the aural, visual or tactile/haptic warnings. For example, when an aircraft with a 26-foot-tall T-tail, such as a Gulfstream 550 is moved into a hangar with a hangar-door height of perhaps 28 feet, there may be no danger of collision between the T-tail and the top of the hangar door, but there is proximity. An embodiment of the invention that has access to positioning information, for example, can employ that information to increase the trigger threshold so that the T-tail passing 2 feet under the known location of the hangar door will not trigger a collision alert. A capability such as this may be useful at a home-base or other familiar hangar where the heights and widths of openings, walls and other structures are known or mapped, but may be of limited value in other locations.

While embodiments of the invention are directed toward warning of and preventing ground collisions while towing fixed-wing aircraft, it is recognized that there are other applications for the technology in situations where a conductive body such as an automobile or tractor-trailer is maneuvered at close quarters or within tight spaces, such as a parking space or the tight loading dock of an urban grocery store. The invention might also find application in situations where an object is fixed in position and the surrounding structure moves to surround it. When towing aircraft, the surrounding medium is generally understood to be air, but embodiments of the invention may be employed in the same manner to sense when one conducting object's proximity to another conducting object or an object with a dielectric constant that is substantially different from that of dielectric medium surrounding the objects, and in which the surrounding medium may be any of a vacuum, including the vacuum of outer space, the atmosphere of any planet or any of its moons, distilled water, oils, petroleum fuels and other natural or synthetic organic liquids and any other non-conductive or low-conductivity liquids or gases.

Embodiments of the invention could be employed to safeguard the repositioning of rotary-wing aircraft (helicopters) when such aircraft have landed on a towing dolly or helicopter tow cart.

The following are Examples which are not limiting of the claims.

Example 1

A system for avoiding contact or collision between an aircraft and nearby objects, persons or structures while said aircraft is being towed on the ground by a tug or towing vehicle, including an apparatus with at least one terminal electrically connectable to a towed aircraft and at least one terminal electrically connectable to at least one reference point, said apparatus configured to measure any or all of capacitance, inductance, resistance, complex impedance, standing wave ratio, S-parameters, electrical bridge balance, incident power, reflected power and other transmission-line, antenna or lumped-element electrical parameters including frequency-domain and time domain characteristics, wherein the at least one reference point may be any or all of:

the frame or chassis of a tug or towing vehicle that is electrically isolated from the conductive aircraft body or airframe;

at least one electrically isolated plate placed below or beside the tug or towing vehicle;

an electrical contact to a conductive or resistive surface upon which the aircraft and tug or towing vehicle are capable of moving, such as the hangar deck of an aircraft carrier; a trailing wire attachable to an earth ground or other surface upon which the aircraft and vehicle are capable of operating;

said system including any or all of audible, visible or graphical alerting capabilities wherein alerts are triggered in response to or in proportion to changes in any or all of said measured electrical parameters, said alerts being either on-off in nature or having audible alerts changeable in any or all of volume, pitch, tone-burst repetition rate or having visible alerts changeable in any or all of brightness, color or flash repetition rate wherein the changes in audible or visible alerts are proportional to changes in the measured electrical parameters, which change in proportion to the physical separation distance between the aircraft and nearby objects, persons or structures, said system including a power supply consisting of any of a primary battery, a rechargeable battery, a cable attachable to the electrical system of the tug or tow vehicle or any external power source.

Example 2

The system of example 1 wherein the apparatus comprises any or all of the following or electronic circuitry equivalent thereto:
- an RF vector impedance meter;
- an S-parameter test set;
- an antenna analyzer;
- an SWR bridge;
- a capacitance meter;
- a baseband time-domain reflectometer;
- an RF time-domain reflectometer;
- a direct sequence spread spectrum time domain reflectometer;
- a multi-carrier time domain reflectometer;
- a transmission-line fault locator;
- at least one bridge-balance driver and sensor apparatus;

Example 3

The system of example 1 wherein the measurement apparatus is capable of measuring voltage, phase, current and other electrical parameters between or among any or all of the electrical junctions between the measurement apparatus and the aircraft being towed, between the measurement apparatus and the at least one reference point, or between the at least one connection to the aircraft being towed and the at least one reference point.

Example 4

The system of example 1 that includes a sensor suite apparatus comprising at least one of:
- a one-, two- or three-axis accelerometer;
- a one-, two- or three-axis angular rate sensor or gyro;
- a separate one-, two- or three-axis angular rate sensor or gyro attachable to the aircraft for sensing towing angle;
- a GPS receiver, with or without WAAS, A-GPS capability or other accuracy or sensitivity-improvement technologies;
- a real-time clock/calendar, which may be disciplined by GPS;
- a barometric pressure sensor;
- a temperature sensor;
- a light sensor, which may include UV index-measurement capability;
- a microphone or acoustic sensor for sensing ambient sound levels and percussive noises;
- a magnetometer for sensing orientation relative to earth's magnetic field and anomalies thereto;
- a wheel rotation sensor for sensing forward or backward rotation of any or all of the wheels of either or both the tug or tow vehicle and the aircraft being repositioned;
- a voltmeter capable of measuring or monitoring any or all of:
  - any battery internal to the subject system;
  - any battery external to the subject system, including the battery or batteries in the tug or tow vehicle and any external measurement devices, including a sensor for towing angle;
- an ammeter capable of measuring any or all of:
  - the current flow from any battery internal to the subject system;
  - the current flow from any battery external to the subject system, including the battery or batteries in the tug or tow vehicle and any external measurement devices, including a sensor for towing angle;
- a digital processor, such as a computer or microcontroller, for performing all necessary calculations and for setting measurement thresholds;
- a local memory cooperating with said digital processor for storing any data, including time-stamped towing-evolution data;
- a still or video camera capable of recording into local memory all towing evolutions or detected incidents, such as collisions;

Example 5

The system of example 1 including wireless-networking capabilities that may include connections to a cloud-based server, said networking capabilities serving at least any or all of the following purposes:
- uploading towing-evolution data;
- uploading accident or incident detections;
- uploading tug or tow-vehicle battery charge state;
- uploading any data from the measurement apparatus or any of its sensors;
- uploading any still or video camera images;
- downloading processor firmware to the system's processor;
- downloading any data deemed useful to the system, such as network time protocol (NTP) clock and calendar signals;
- and wherein the wireless-networking technology may be any of WiFi, LTE, 5G, GSM, Bluetooth, Zigbee or any other long- or short-range terrestrial or satellite wireless communications technologies.

Example 6

The system of example 5 wherein the cloud server, if any, may include at least any or all of the following:
- at least one secure port or socket for interconnection with network-capable embodiments of the invention;
- at least one administrative port accessible by http, https, ssh, telnet or another protocol;
- a queryable database;
- an application programmer interface;
- a mail server;
- a text server;
- a video server.

Example 7

The system of example 1 that is configured for use with any vehicle capable of moving or transporting persons or freight, including but not limited to automobiles and trucks, wherein the first terminal of the measuring apparatus is connected to any of:

the chassis, frame or bumpers of an automobile or other vehicle;

the trailer of a tractor-trailer;

the conducting body of any mechanized transportation device, including a bicycle;

and wherein the second terminal of the measurement apparatus is connected to a reference terminal, which may be any of:

the tractor of a tractor-trailer combination;

at least one conductive plate underneath or beside the vehicle capable of moving;

an electrical contact to a conductive or resistive plate upon which the vehicle is capable of moving;

a trailing wire connected to earth ground or other surface upon which the vehicle is capable of operating.

Example 8

A method for determining the proximity of an aircraft being towed or otherwise repositioned on the ground to surrounding objects or structures comprising the steps of:

exciting through direct or indirect coupling an aircraft fuselage, wing or tail with a radio frequency (RF) signal wherein the radio-frequency signal may be fixed, swept or frequency modulated, stepped or hopped in frequency or amplitude, or digitally modulated in any way including phase, amplitude or OFDM;

initiating a calibration procedure wherein any or all of specific frequencies, connection modalities or modes of operation are manually or automatically selected or optimized, and one or more initial or calibration values is stored via sampling and holding or storing within analog or digital circuitry prior to aircraft movement to establish at least one baseline reference parameter;

thereafter continuously measuring a reflected voltage or current from the aircraft body using a voltage measuring network at one or a plurality of frequencies until the aircraft-movement evolution is complete;

calculating continuously within analog or digital circuitry the complex measurement values at one or a plurality of frequencies and calculating a difference value between the baseline reference parameter and the present or instant measurements;

in response to changes in said difference value, generating any or all of an aural, visual, tactile, haptic or other human-sensible warning signal or alert that may be on/off in response to said difference value crossing a predetermined threshold or may be proportional to the absolute or vector magnitude of said difference signal so that a characteristic of the warning signal or alert such as the loudness, pitch or pulse rate of a sound or the brightness or flash rate of a visible alert changes in proportion to said difference value, thus providing an alert in response to diminishing proximity between the subject aircraft and surrounding objects or structures.

Example 9

A method for determining the proximity of an aircraft being towed or otherwise repositioned on the ground to surrounding objects, persons or structures comprising the steps of:

exciting an aircraft fuselage or body with a radio frequency (RF) signal wherein the radio-frequency signal may be fixed, swept or frequency modulated, stepped or hopped in frequency or amplitude, or digitally modulated in any way including phase, amplitude or OFDM;

initiating a calibration procedure wherein any or all of specific frequencies, connection modalities or modes of operation are manually or automatically selected or optimized, and one or more initialization or calibration values stored via sampling and holding or storing within analog or digital circuitry at least one differential imbalance parameter which may be scalar or complex at one or a plurality of frequencies prior to aircraft movement to establish at least one baseline differential imbalance value;

Example 10

An apparatus comprising differential drive circuitry capable of electrically coupling directly or indirectly to an aircraft directly by wires, by electromagnetic means, capacitively, inductively and acting internally or externally to the aircraft being repositioned, said apparatus capable of inducing or generating a differential RF voltage between the two wingtips including:

RF sensing circuitry such as synchronous detection circuitry or SDR signal-processing algorithms capable of quantifying the phase or amplitude of the ordinarily balanced and therefore zero RF voltage or lateral error signal between a reference point that is at the same potential as the nose, center or fuselage of the aircraft and earth ground or a conductive surface coupled to earth ground such as a tug, the amplitude of said lateral error signal corresponding to the distance between the aircraft and a proximate object, person or structure and the relative phase of said lateral error signal with respect to the original differential drive signal corresponding to the object, person or structure approaching either the left or right by 0- or 180-degree phase, respectively, and relative position along the wing by intermediate relative phase values;

signal processing circuitry or algorithms capable of performing any or all of rectification, synchronous detection, absolute value calculation, low-pass filtering, integration, noise filtering or blanking, scaling or time-averaging of said error signal and sensing when the post-processed error signal has exceeded one or more preset or adaptively established threshold values;

alerting circuitry capable of generating or activating any or all of audible, visual, graphical, numeric, tactile or haptic alerts in response to said lateral error signal crossing one or more of said thresholds, or proportionately in direct response to the post-processed lateral error signal.

Example 11

An apparatus comprising differential drive circuitry capable of electrically coupling directly or indirectly to an aircraft directly by wires, by electromagnetic means, capacitively, inductively and located internally or externally to the aircraft, said apparatus capable of inducing or generating a differential RF voltage along the fuselage between the wing as a whole and the aircraft's tail section:

RF sensing circuitry or SDR signal-processing algorithms capable of quantifying the phase or amplitude of the ordinarily balanced and therefore zero RF voltage or lengthwise error signal between a reference point that is at the same potential as the main gear, wing roots or fuselage/wing intersection point of the aircraft and earth ground or a conductive surface coupled to earth ground such as a tug, the amplitude of said lengthwise error signal corresponding to the distance between the aircraft and a proximate object, person or structure and the relative phase of said lengthwise error signal with respect to the original differential drive signal corresponding to the object, person or structure approaching either the wing or the tail by 0- or 180-degree phase, respectively, and relative position along the wing or fuselage by intermediate relative phase values;

signal processing circuitry or algorithms capable of performing any or all of rectification, synchronous detection, absolute value calculation, low-pass filtering, integration, noise filtering or blanking, scaling or time-averaging of said lengthwise error signal and sensing when the post-processed error signal has exceeded one or more preset or adaptively established threshold values;

alerting circuitry capable of generating or activating any or all of audible, visual, graphical, numeric, tactile or haptic alerts in response to said lengthwise error signal crossing one or more of said thresholds, or proportionately in direct response to the post-processed error signal.

Example 12

An apparatus comprising differential drive circuitry capable of electrically coupling directly or indirectly to an aircraft directly by wires, by electromagnetic means, capacitively, inductively and acting internally or externally to the aircraft being repositioned, said apparatus capable of inducing or generating a differential RF voltage between a first and second attach point with or without a third center tap or neutral attach point, said first, second and third attach points connected in any fixed or time-multiplexed arrangement to any two or three contact points of an aircraft, including but not limited to:
the starboard wing;
the port wing;
the starboard main gear;
the port main gear;
the nose gear;
the nose
the tail section;
the left horizontal stabilizer;
the right horizontal stabilizer;
the vertical stabilizer;
the fuselage;
earth ground, directly or capacitively;
a mechanically linked but electrically isolated tug or tow tractor;
a plate or electrode mechanically attached to but electrically isolated from a tug or tow tractor;
and including RF sensing circuitry such as synchronous detection circuitry or SDR signal-processing algorithms capable of quantifying the phase or amplitude of the ordinarily balanced and therefore zero RF voltage or lateral error signal between one reference point and one sense point, each of which may be any of the above attach points wherein such attach points may be fixed or multiplexed in a time synchronous manner with such time-multiplexed changes in the two or three attach points of the differential drive circuitry, the amplitude of said error signal corresponding to the distance between the aircraft and a proximate object, person or structure and the relative phase of said lateral error signal, with respect to the original differential drive signal phase, being used to resolve any left-right or front-rear ambiguity with respect to the location of the proximate object, person or structure relative to the aircraft;

signal processing circuitry or algorithms capable of performing any or all of rectification, synchronous detection, absolute value calculation, low-pass filtering, integration, noise filtering or blanking, scaling or time-averaging of said error signal and sensing when the post-processed error signal has exceeded one or more preset or adaptively established threshold values;

alerting circuitry capable of generating or activating any or all of audible, visual, graphical, numeric, tactile or haptic alerts in response to said lateral error signal crossing one or more of said thresholds, or proportionately in direct response to the post-processed lateral error signal.

Example 13

An apparatus comprising differential drive circuitry capable of electrically coupling directly or indirectly to a vehicle such as an automobile directly by wires, by electromagnetic means, capacitively, inductively and acting internally or externally to the aircraft being repositioned, said apparatus capable of inducing or generating a differential RF voltage between a first and second attach point with or without a third center tap or neutral attach point, said first, second and third attach points connected in any arrangement to any two or three contact points of said vehicle, with potential attach points including but not limited to:
the front right bumper;
the front left bumper;
the front bumper's center;
the left front or rear door;
the right front or rear door;
the left rear bumper;
the right rear bumper;
the center rear bumper;
the chassis;
earth ground, directly or capacitively;
and including RF sensing circuitry such as synchronous detection circuitry or SDR signal-processing algorithms capable of quantifying the phase or amplitude of the ordinarily balanced and therefore zero RF voltage or lateral error signal between one reference and one sense point, each of which may be any of the above attach points, the amplitude of said error signal corresponding to the distance between the vehicle and a proximate object, person or structure and the relative phase of said lateral error signal with respect to the original differential drive signal phase being used to resolve any left-right or front-rear ambiguity with respect to the location of the proximate object, person or structure relative to said vehicle;

signal processing circuitry or algorithms capable of performing any or all of rectification, synchronous detection, absolute value calculation, low-pass filtering, integration, noise filtering or blanking, scaling or time-averaging of said error signal and sensing when the post-processed error signal has exceeded one or more preset or adaptively established threshold values;

alerting circuitry capable of generating or activating any or all of audible, visual, graphical, numeric, tactile or haptic alerts in response to said lateral error signal crossing one or more of said thresholds, or proportionately in direct response to the post-processed lateral error signal.

Example 14

The alerting circuitry of example 13 wherein said circuitry is electrically linked to physical motion-cessation capabilities such as solenoids, motors, hydraulic valves or pumps that are capable of being electrically actuated to slow or halt physical motion so that imminent collisions are prevented directly rather than relying upon a human operator to intervene in response to audible, visual, haptic or tactile warnings and thereby enabling or supporting robotic movement or parking.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

One of skill in the art will understand that the apparatuses, systems, and methods of the present invention may be used together to create further embodiments of the present invention. While the invention has been described in detail in connection with specific embodiments, it should be understood that the invention is not limited to the above-disclosed embodiments. Rather, a person skilled in the art will understand that the invention can be modified to incorporate any number of variations, alternations, substitutions, or equivalent arrangements not heretofore described, but which are commensurate with the spirit and scope of the invention. Specific embodiments should be taken as exemplary and not limiting.

What is claimed is:

1. A system for collision avoidance, the system comprising:
   a first apparatus comprising a first terminal and a second terminal;
   a first vehicle electrically coupled to the first terminal and having a first electrical characteristic;
   a reference point electrically coupled to the second terminal and having a reference electrical characteristic; and
   wherein the apparatus is configured to determine a proximity between the first vehicle and a nearby object using the first electrical characteristic and the reference electrical characteristic.

2. The system of claim 1, wherein said reference point is the frame of a second vehicle which is electrically isolated from said first vehicle.

3. The system of claim 2, wherein said second vehicle is a towing vehicle.

4. The system of claim 1, wherein said reference point is at least one electrically isolated plate associated with a second vehicle.

5. The system of claim 1, wherein said reference point is a conductive surface on which the first vehicle or a second vehicle are configured to move upon.

6. The system of claim 1, wherein said first vehicle is an airplane.

7. The system of claim 6, wherein said reference point is the frame of a second vehicle which is electrically isolated from said airplane.

8. The system of claim 1, wherein said first apparatus is configured to identify deviations of said reference electrical characteristic and to subsequently warn a user of the system based on said deviations.

9. The system of claim 8, wherein said deviations of said reference electrical characteristic correlate to the proportional physical separation distance between said first vehicle and said nearby object.

10. The system of claim 1, wherein said reference electrical characteristic is at least one of capacitance, inductance, resistance, complex impedance, standing wave ratio, S-parameters, electrical bridge balance, incident power, reflected power and other transmission-line, antenna electrical parameters, lumped-element electrical parameters, frequency-domain, and/or time domain characteristics.

11. A collision avoidance system, the system comprising:
    a differential drive circuit coupled to a first vehicle;
       wherein said coupling is achieved by a first electromagnetic association,
       wherein said circuit acts upon said first vehicle by way of said first electromagnetic association;
       wherein said circuit measures a metric associated with the first electromagnetic association to determine the relative spatial position of said first vehicle to an environment.

12. The system of claim 11, further comprising a reference point, wherein said differential drive circuit is coupled to said reference point by a second electromagnetic association.

13. The system of claim 12, wherein said differential drive circuit monitors metrics associated with the first and second electromagnetic association, the differential drive circuit signaling in response to changes in a metric of the first or second electromagnetic association.

14. The system of claim 11, wherein said first vehicle is an airplane.

15. A method of collision avoidance, the method comprising:
    connecting a first apparatus to a first vehicle via a first electrical connection; and
    connecting a second apparatus to one or more reference point via a second electrical connection,
       wherein said apparatus is configured to measure one or more signal metric from said one or more reference point, and
       wherein said apparatus monitors the spatial relationship of said first vehicle to an environment by way of changes in said one or more signal metric.

16. The method of claim 15, wherein said one or more reference point is the frame of a second vehicle which is electrically isolated from said first vehicle.

17. The system of claim 16, wherein said second vehicle is a towing vehicle.

18. The method of claim 15, further comprising monitoring said apparatus for alerts related to said spatial relationship.

19. The method of claim 16, further comprising moving said first vehicle relative to its environment while continuously monitoring said apparatus for alerts.

20. The method of claim 19, further comprising adjusting said movement of said first vehicle based on the status of said alerts.

\* \* \* \* \*